(12) United States Patent
Tauchi et al.

(10) Patent No.: US 8,477,023 B2
(45) Date of Patent: Jul. 2, 2013

(54) INFORMATION PRESENTATION APPARATUS

(75) Inventors: Makiko Tauchi, Kariya (JP); Seiji Kawai, Aichi-gun (JP); Akira Takahashi, Nisshin (JP); Shingo Shibata, Chiryu (JP); Sueharu Nagiri, Nagoya (JP); Kazuhiko Suzuki, Hazu-gun (JP)

(73) Assignee: DENSO CORPORATION, Kariya (JP)

( * ) Notice: Subject to any disclaimer, the term of this patent is extended or adjusted under 35 U.S.C. 154(b) by 421 days.

(21) Appl. No.: 12/926,572

(22) Filed: Nov. 24, 2010

(65) Prior Publication Data

US 2011/0128139 A1 Jun. 2, 2011

(30) Foreign Application Priority Data

Nov. 27, 2009 (JP) ................................. 2009-270440

(51) Int. Cl.
*B60Q 1/00* (2006.01)

(52) U.S. Cl.
USPC ........................................................ 340/439

(58) Field of Classification Search
USPC .......... 340/439, 901, 995.17, 995.14, 426.16, 340/438; 701/1
See application file for complete search history.

(56) References Cited

U.S. PATENT DOCUMENTS

| | | | |
|---|---|---|---|
| 6,249,720 B1 | 6/2001 | Kubota et al. | |
| 6,720,938 B2 * | 4/2004 | Ohkawara et al. | 345/7 |
| 2005/0071082 A1 * | 3/2005 | Ohmura et al. | 701/211 |
| 2006/0187304 A1 * | 8/2006 | Sakata | 348/148 |
| 2007/0118282 A1 * | 5/2007 | Yamamoto et al. | 701/211 |

FOREIGN PATENT DOCUMENTS

| | | |
|---|---|---|
| JP | A-H07-61257 | 3/1995 |
| JP | A-H11-245683 | 9/1999 |
| JP | A-2001-101595 | 4/2001 |
| JP | A-2002-174526 | 6/2002 |
| JP | A-2002-373396 | 12/2002 |
| JP | A-2003-30799 | 1/2003 |
| JP | A-2004-295472 | 10/2004 |
| JP | A-2005-127749 | 5/2005 |
| JP | A-2006-090844 | 4/2006 |
| JP | A-2006-215911 | 8/2006 |
| JP | A-2007-122536 | 5/2007 |
| JP | A-2007-286898 | 11/2007 |

OTHER PUBLICATIONS

Office Action mailed Dec. 20, 2011 in corresponding JP Application No. 2009-270440 (and English Translation).

* cited by examiner

*Primary Examiner* — Phung Nguyen
(74) *Attorney, Agent, or Firm* — Posz Law Group, PLC

(57) ABSTRACT

An information presentation apparatus includes an action determination section to execute a determination as to whether a driver becomes aware of an attention-seeking display sign or an alarm display sign, and an information presentation control circuit to cause a display device to perform a display changeover to change a display mode of an attention-seeking display sign or alarm display sign into an attenuation display mode based on an affirmative result from the determination by the action determination section. Herein, the action determination section executes the above determination based on reference information such as driver action confirmation information or vehicle information, which is a signal generated by a switch manipulation or a driving operation of the driver when noticing the attention-seeking display sign or alarm display sign displayed in the display device.

18 Claims, 7 Drawing Sheets

FIG. 3 LEFT-HAND TRAFFIC
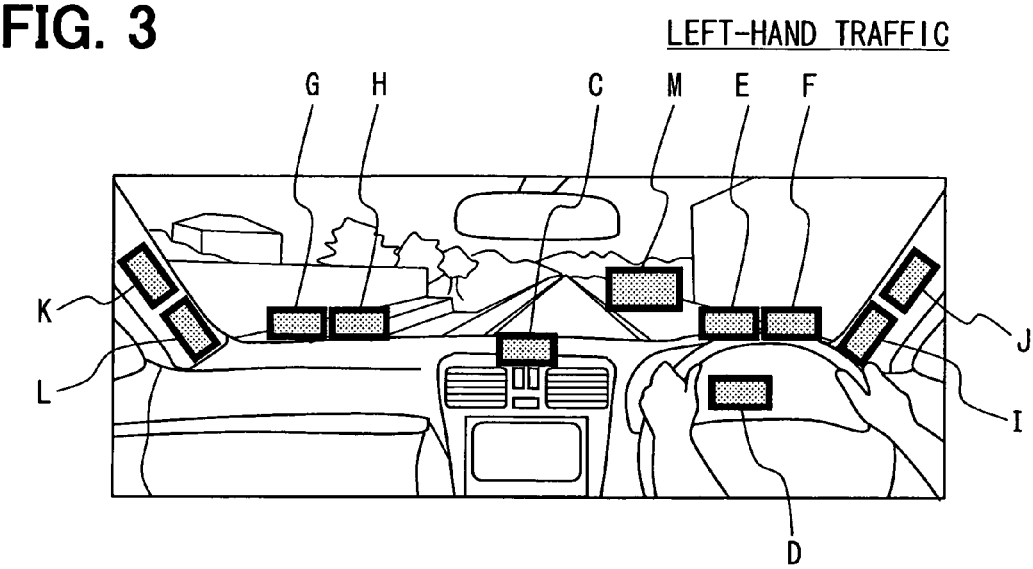
FIG. 4 LEFT-HAND TRAFFIC
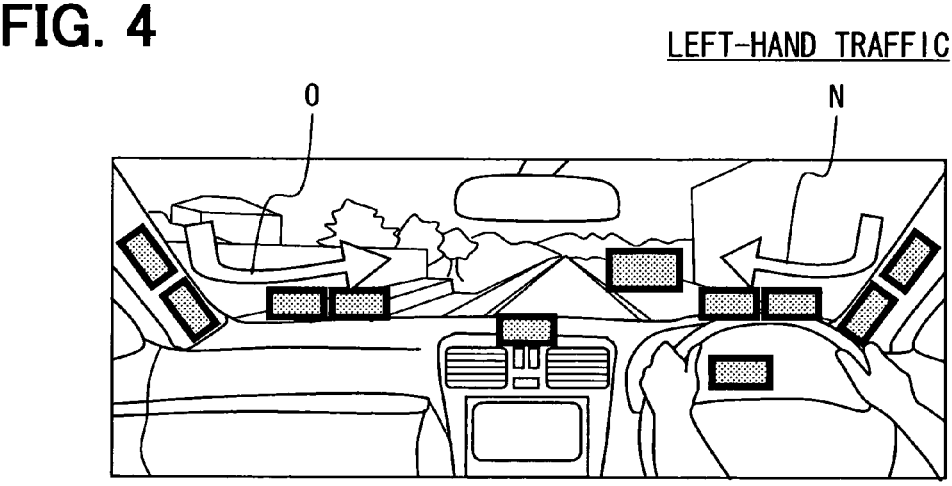
FIG. 5
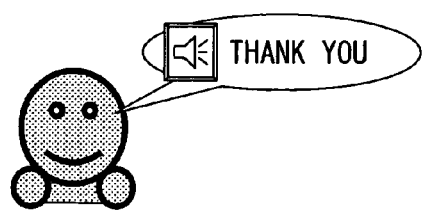

LEFT-HAND TRAFFIC

FIG. 13    LEFT-HAND TRAFFIC
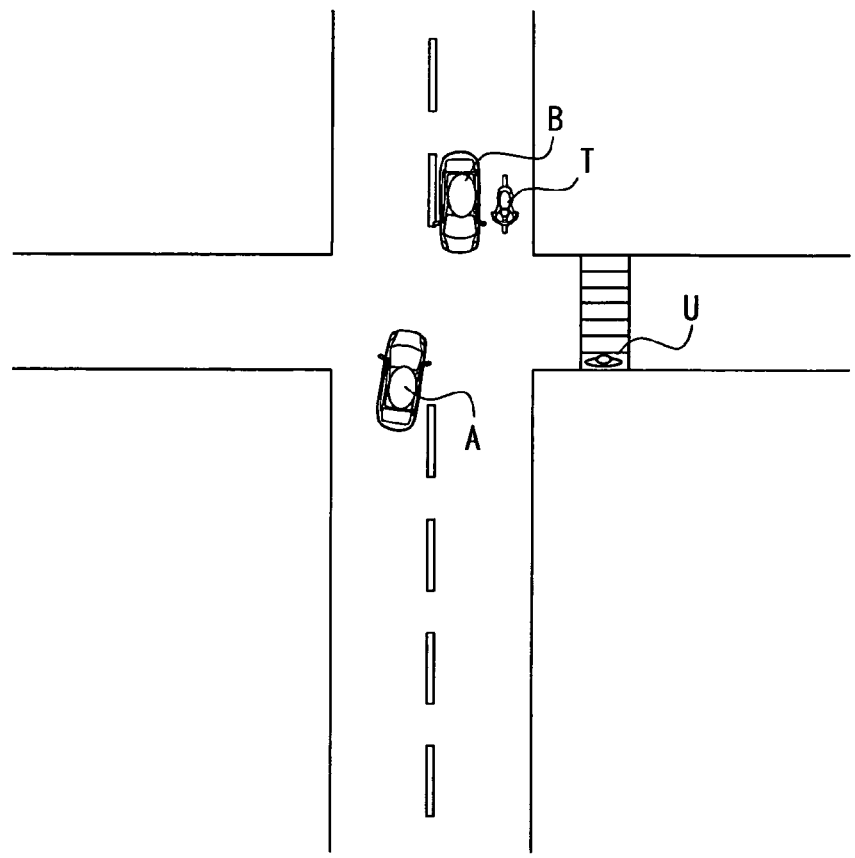
FIG. 14
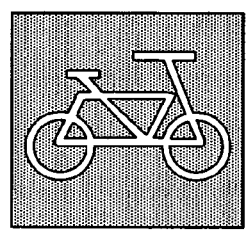
FIG. 15
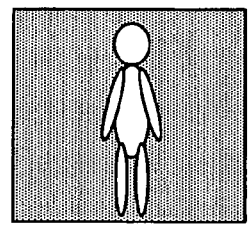

INFORMATION PRESENTATION APPARATUS

CROSS REFERENCE TO RELATED APPLICATION

The present application is based on and incorporates herein by reference Japanese Patent Application No. 2009-270440 filed on Nov. 27, 2009.

FIELD OF THE INVENTION

The present invention relates to an information presentation apparatus which presents information on driving operation support.

BACKGROUND OF THE INVENTION

[Patent document 1] JP-2004-295472 A

There is conventionally known a technology to present a driver with information on driving operation support. In addition, in recent years, a large number of information items or signs relating to driving operation support have been presented to a driver.

However, although a driver is aware of the presented information items or signs, the driver feels botheration in the presentation of a large number of information items or signs. In addition, if the driver is presented with a large number of information items or signs when there is no time margin, the driver is confused. This may cause the driver to be impossible to recognize the information appropriately.

That is, the above mentioned technology may provide a disadvantage to degrade a comfortable ride for the driver.

Then, a measure is adopted to solve such a disadvantage as follows. For example, Patent document 1 discloses a vehicular alarm device which detects a direction of a sight line of a driver using a detector; determines based on the detected sight line whether the driver recognizes an obstacle; and prevents an alarm signal from outputting when it is determined that the driver recognized the obstacle, thereby eliminating a sense of interfere.

In this regard, however, even if the sight line of the driver is directed to the obstacle, the driver may not always recognize the obstacle. Thus, the driver may not move to action for collision prevention. In the vehicular alarm device in Patent document 1, the direction of the sight line is detectable, but it is not determinable whether the driver actually recognizes the obstacle. This may provide a possibility of canceling also an alarm signal which has a high necessity for output. That is, the vehicular alarm device in Patent document 1 poses a disadvantage that an accuracy of the alarm is not securable.

Further, in the vehicular alarm device in Patent document 1, it is necessary for a vehicle to carry a sight line detector to detect a sight line of a driver; however, a space to mount it is limited in the vehicle. It is thus not so easy to secure the space in the vehicle for installing the above sight line detector in addition to general in-vehicle apparatuses such as an in-vehicle navigation apparatus. This poses a problem that the implementation is not easy. Furthermore, mounting additionally such a sight line detector to detect only a direction of the sight line of the driver poses a problem to cause useless costs.

SUMMARY OF THE INVENTION

The present invention is made in view of the above situation. It is an object to provide an information presentation apparatus to help prevent the deterioration of a comfort in ride for a driver while providing a high accuracy, an easy implementation, and a decrease of useless costs.

To achieve the above object, according to an example of the present invention, an information presentation apparatus in a vehicle is provided as follows. A display control circuit is configured to cause a display device to display a safe driving support information sign, which urges a driver of the vehicle to perform a driving operation responding to processing of a safe driving support application to support a safe driving of the vehicle. An action determination section is configured to execute a driver awareness determination as to whether the driver is aware of the safe driving support information sign. The display control circuit is further configured to, based on an affirmative result of the driver awareness determination obtained by the action determination section, cause the display device to execute a display erasure or a display attenuation of the driving support information sign, the display erasure stopping the displaying of the safe driving support information sign, the display attenuation executing a display mode changeover to change a display mode of the safe driving support information sign into an attenuation display mode, which helps prevent a blockage of a visual field of the driver. The action determination section is further configured to execute the driver awareness determination based on vehicle-inside information which includes a signal arising from an operation executed by the driver when the driver becomes aware of the safe driving support information sign displayed by the display device.

The above example of the information presentation apparatus operates as follows: when noticing a safe driving support information sign displayed in the display device, the driver executes a predetermined operation; such a driver's executing operation then generates a signal as vehicle-inside information; and, based on the vehicle-inside information, the action determination section is designed to execute a driver awareness determination as to whether the driver is aware of the safe driving support information sign. This can eliminate a need of adding an apparatus for determining the presence or absence of the driving operation. Therefore, securing the space which accommodates the above-mentioned new added apparatus becomes unnecessary in the vehicle, and makes the configuration easy. Further, the useless costs of installation of the newly added apparatus can be removed.

Further, based on the affirmative result of the determination as to whether the driver becomes aware of the safe driving support information, the display of the safe driving support information may be erased or attenuated so as to help prevent the displayed safe driving support information from blocking the visual field of the driver. This can prevent the driver from feeling botheration because of the display sign or displayed information continued in the same mode as it is regardless of the driver having already recognized. Therefore, the above configuration helps prevent the comfort in ride for the driver from being spoiled.

According to another example of the present invention, a method is provided for presenting a driver in a vehicle with a driving support information notice. The method comprises: acquiring infrastructure information using at least one of vehicle-to-vehicle communications and road-to-vehicle communications; detecting an attention target ahead of the vehicle, the attention target to which the driver needs, to pay attention based on the acquired infrastructure information; selecting a driving support application based on the detected attention target: starting a notice presentation to present the driver with a driving support information notice associated with the selected driving support application in an initial presentation mode in a visible presentation manner or an audible presentation manner; executing a driver awareness determination as to whether the driver is aware of the driving support information notice based on vehicle-inside information, wherein the vehicle-inside information is a signal arising from an operation executed by the driver when the driver becomes aware of the presented driving support information notice; and executing, when an affirmative result is obtained from the executed driver awareness determination, one of (i) a presentation stoppage and (ii) a presentation attenuation of the driving support information notice, the presentation stoppage stopping the started notice presentation, the presentation attenuation executing a presentation mode changeover to change a presentation mode of the driving support information notice from the initial presentation mode into an attenuation presentation mode, the attenuation presentation mode reducing, compared with the initial presentation mode, a blockage against the driver during driving the vehicle towards the attention target.

BRIEF DESCRIPTION OF THE DRAWINGS

The above and other objects, features, and advantages of the present invention will become more apparent from the following detailed description made with reference to the accompanying drawings. In the drawings:

FIG. 3 is a diagram illustrating an example of display portions or display positions;

FIG. 4 is a diagram for explaining an example of displaying an attention-seeking display sign or an alarm display sign in line with a moving direction of an obstacle;

FIG. 5 is a diagram illustrating an example of an agent-type icon;

FIG. 13 is a diagram for explaining a right-turn collision prevention application in the left-hand traffic;

FIG. 14 is a diagram illustrating an example of a display sign in the display device; and FIG. 15 is a diagram illustrating an example of a display sign in the display device.

DETAILED DESCRIPTION OF THE PREFERRED EMBODIMENTS

Figure 1:
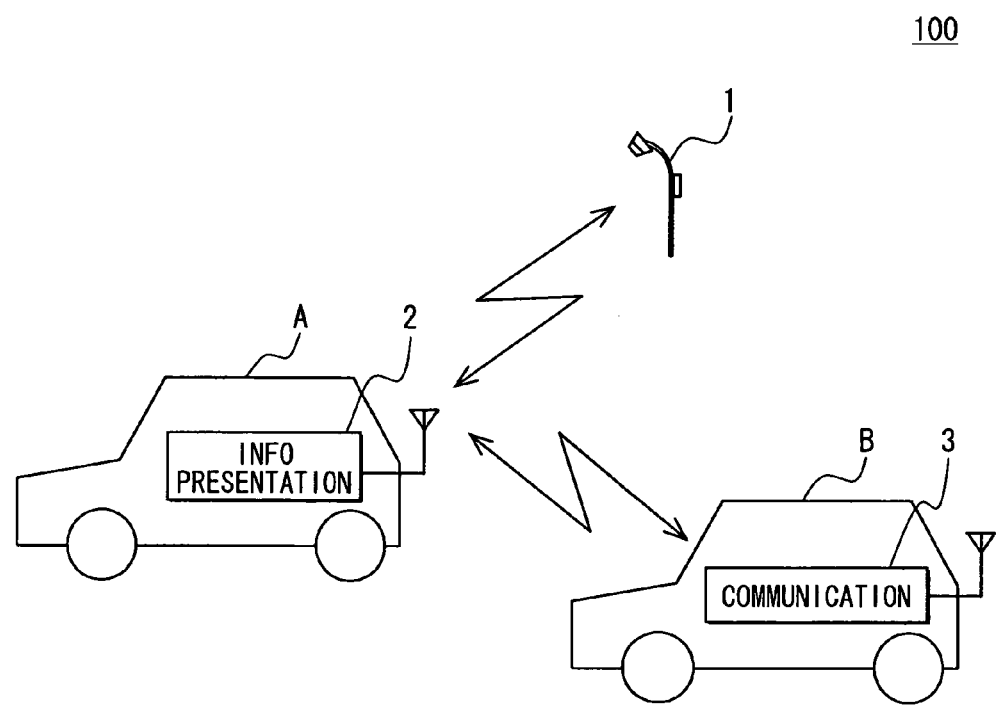
FIG. 1 is a block diagram illustrating an overall configuration of a safe driving support system according to an embodiment of the present invention.

An embodiment of the present invention is explained with reference to drawings. FIG. 1 is a block diagram illustrating an overall configuration of a safe driving support system 100 according to an embodiment of the present invention. The safe driving support system 100 in FIG. 1 includes a roadside apparatus 1, an information presentation apparatus 2 mounted in a first vehicle A, and an in-vehicle communications apparatus 3, mounted in a second vehicle B. The first vehicle A carrying the information presentation apparatus 2 may be called a subject vehicle A. The second vehicle B carrying the communications apparatus 3 may be called a counterpart vehicle B or the other vehicle B.

In the safe driving support system 100, the roadside apparatus 1 and the information presentation apparatus 2 in the subject vehicle A exchange information therebetween via a road-to-vehicle communications link; the in-vehicle communications apparatus 3 in the counterpart vehicle B and the information presentation apparatus 2 in the subject vehicle A exchange information therebetween via a vehicle-to-vehicle communications link. Such a configuration can provide a safe driving support according to a surrounding traffic situation etc.

The roadside apparatus 1 is arranged fixedly (i.e., in a stationary state) at a predetermined position on a roadside or the like while having a function of a wireless communications apparatus to execute road-to-vehicle communications. Transmission and reception of the information between the roadside apparatus 1 and the information presentation apparatus 2 may be performed using VICS (Vehicle Information and Communication System, registered trademark), DSRC (Dedicated Short Range Communication), or wireless LAN, for example. In addition, the infrastructure information distributed from the roadside apparatus 1 is information relevant to travel plan of the subject vehicle A, which is hereinafter referred to as travel plan information. Such travel plan information includes the following: obstacle information, which indicates a velocity, heading direction, present position of a pedestrian or another vehicle, which may interfere with the advance of the subject vehicle A; regulatory road sign information, which indicates a temporary halt position regulated by a road painted marker or traffic sign; road surface information, which indicates a snow coverage, icy condition, etc.; accident occurrence point information; highway regulation information; traffic congestion information; and traffic signal information. The infrastructure information distributed from the roadside apparatus 1 may be provided from an information center which manages infrastructure information in an integrative manner, for example.

The in-vehicle communications apparatus 3 carried in the counterpart vehicle B is provided with a function of a wireless communications apparatus to perform vehicle-to-vehicle communications. Transmission and reception of the information between the in-vehicle communications apparatus 3 and the information presentation apparatus 2 may be performed using infrared ray communications or DSRC, for example. In addition, the infrastructure information transmitted from the in-vehicle communications apparatus 3 of the counterpart vehicle B includes its present position information, heading direction information, braking state information, and velocity information, for instance. It is noted that the above present position information, heading direction information, braking state information, and velocity information of the counterpart vehicle B may be acquired by the in-vehicle communications apparatus 3 from an in-vehicle navigation apparatus, a cellular phone with a GPS function, or various sensors carried in the counterpart vehicle.

The information presentation apparatus 2 is mounted in the subject vehicle, and is provided with a function of a wireless communications apparatus to execute road-to-vehicle communications and vehicle-to-vehicle communications. In addition, the information presentation apparatus 2 is provided with an application software program which offers a safe driving support according to surrounding traffic situations etc. based on the infrastructure information acquired by the road-to-vehicle communications or vehicle-to-vehicle communications.

Figure 2:
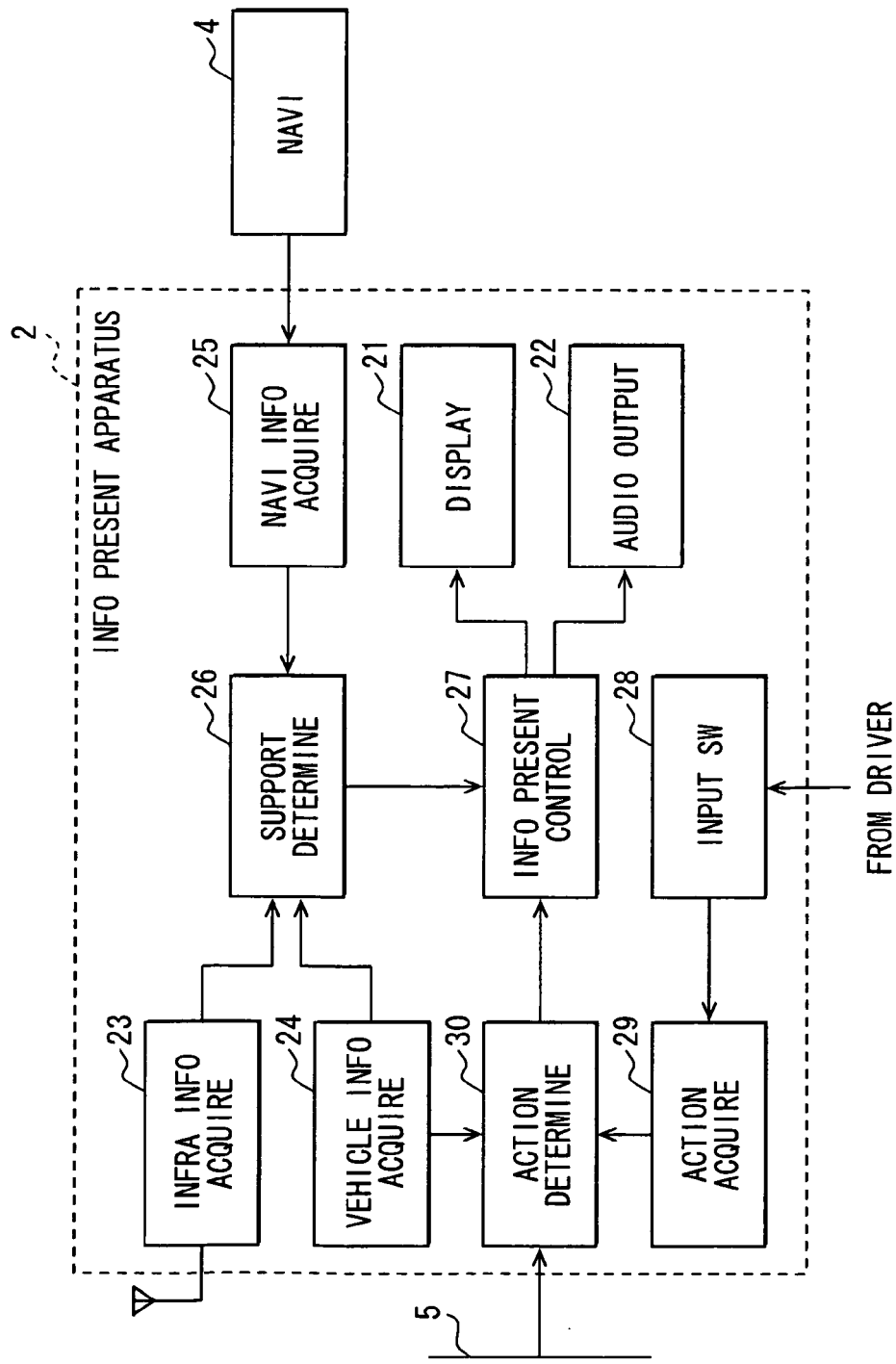
FIG. 2 is a block diagram illustrating a configuration of an information presentation apparatus according to the embodiment.

The following explains an outline configuration of the information presentation apparatus 2 with reference to FIG. 2. FIG. 2 is a block diagram illustrating a configuration of the information presentation apparatus 2. As illustrated in FIG. 2, the information presentation apparatus 2 includes the following: a display device 21, an audio output device 22, an infrastructure information acquisition device 23, a vehicle information acquisition device 24, a navigation information acquisition device 25, a support determination section 26, an information presentation control circuit 27, an input switch device 28, an action acquisition device 29, and an action determination section 30. In addition, the subject vehicle A has an in-vehicle navigation apparatus 4.

The display device 21 can perform a color display; the device 21 can be constructed of a liquid crystal display, an organic electroluminescence display, a plasma display, etc. In addition, the display device 21 of the information presentation apparatus 2 can include several display portions. For example, as illustrated in FIG. 3, the display device 21 includes several display portions as follows: a display portion C of the in-vehicle navigation apparatus 4; a head up display (HUD); a display portion D provided in a meter panel; a display portion E in a direct front face of the instrument panel; a display portion F in a right front face of the instrument panel; display portions G, H in a left front face of the instrument pane; display portions I, J in a right pillar; and display portions K, L in a left pillar. Furthermore, M of FIG. 3 indicates a display portion or range where a display image is projected in a front portion of the windshield by the HUD. Herein, the display portion M of the HUD is also included as a display portion of the display device 21. Further, the display device 21 is preferably arranged ahead of a position where a driver is seated (i.e., ahead of a driver seat), from an aspect of ease of the driver's check.

Returning to FIG. 2, the audio output device 22 includes a speaker and outputs a guidance sound, alarm sound, etc., based on an instruction (i.e., an instruction signal) of the information presentation control circuit 27.

The infrastructure information acquisition device 23 receives the infrastructure information transmitted from the roadside apparatus 1 or the in-vehicle communications apparatus 3, and transmits it to the support determination section 26. The vehicle information acquisition device 24 acquires a signal (hereinafter, referred to as vehicle information) which is exchanged in the in-vehicle LAN 5 and transmits it to the support determination section 26 and the action determination section 30. For example, the in-vehicle LAN 5 can use CAN (controller area network), MOST (Media Oriented Systems Transport, registered trademark), or LIN (local Interconnect Network).

In addition, a signal, which is exchanged in the in-vehicle LAN 5, is a sensor signal generated by a driving operation of the subject vehicle A. Herein, the vehicle information can be referred to as vehicle-inside information. For instance, the sensor signal includes the following: a sensor signal indicating an ON state or an OFF state of the brake obtained from a brake switch; a sensor signal indicating an amount of stepping in of the brake pedal obtained from a brake stroke sensor; a sensor signal indicating an accelerator opening degree obtained from an accelerator opening sensor; a sensor signal indicating a heading direction of the subject vehicle A obtained from a geomagnetic sensor or a gyroscope; a sensor signal indicating a velocity of the subject vehicle A obtained from a vehicle velocity sensor or a vehicle wheel velocity sensor; a sensor signal indicating a movement amount of the subject vehicle A obtained from the vehicle wheel velocity sensor; and a sensor signal indicating an acceleration and deceleration of the subject vehicle A obtained from an acceleration sensor.

The navigation information acquisition device 25 acquires map information and the present position information of the subject vehicle A from the in-vehicle navigation apparatus 4, and transmits them to the support determination section 26. The map information includes road data having node data and link data for indicating roads. Nodes are points at which roads cross, branch, or join; links are road segments between nodes. A road is constituted by connecting links. Link data relative to each link include a unique number (link ID) for specifying the link, a link length for indicating the length of the link, a link direction, a link orientation, start and end node coordinates (latitudes and longitudes), a road name, a road class, a road width, the number of lanes, presence/absence of dedicated lanes for right/left turn and the number thereof, and a velocity limit. In contrast, node data relative to each node include a unique number (node ID) for specifying the node, node coordinates, a node name, connection link IDs for indicating links connected to the node, an intersection class, and an intersection figuration.

Based on the infrastructure information acquired from the infrastructure information acquisition device 23, the vehicle information acquired from the vehicle information acquisition device 24, and the map information and the subject vehicle's present position information acquired from the navigation information acquisition device 25, the support determination section 26 determines the presence or absence of execution of safe driving support and the stage of safe driving support according to the surrounding traffic situation etc (hereinafter, referred to as a support determination process).

For example, the following explains a collision prevention application in which information is presented according to a degree of a danger of a collision with an obstacle such as a pedestrian, a two-wheeled vehicle, and another vehicle. In the collision prevention application, the support determination section 26 determines the presence or absence of the danger and the degree of the danger with respect to the collision between the subject vehicle A and the obstacle based on the information on the present position information of the obstacle and the subject vehicle A, and the velocity information of the obstacle and the subject vehicle A. Herein, the obstacle may be referred to as a danger target. In addition, the presence or absence and the degree of the danger with respect to the collision between the subject vehicle A and the obstacle may be determined using a known method such as TTC (time to collision), which is obtained by dividing a distance between the subject vehicle A and the obstacle by a relative velocity between the subject vehicle A and the obstacle.

The following explains the degree of the danger of the collision in differentiated two steps of (i) $TTC<=\alpha$, and (ii) $\alpha<TTC<=\beta$. In addition, the degree of the danger of the collision decreases in order of the case of (i) $TTC<=\alpha$ which requires an alarm, and the case of (ii) $\alpha<TTC<=\beta$ which requires an attention-seeking. It is noted that $\alpha$ and $\beta$ are values previously defined according to the degree of the danger of the collision, and may be defined arbitrarily.

In addition, this explains an example to divide the degree of the danger into two steps of an attention-seeking and an alarm; however, there is no need to be limited thereto. For example, it may be divided into three steps of, from a lower in the degree of the danger, the case requiring information presentation, the case requiring an attention-seeking, and the case requiring an alarm.

In addition, the following explains a temporary halt failure prevention application, in which a temporary halt sign and marking, or a red traffic signal which exists ahead of the subject vehicle in the heading direction of the vehicle are detected, and the information is presented according to the arrival time of the subject vehicle to the temporary halt point defined by the detected temporary halt sign and marking, or the red traffic signal. The support determination section 26 detects the temporary halt sign and marking, or the red traffic signal which exists ahead of the subject vehicle A based on regulatory sign information, signaling information, map information, or the present position information of the subject vehicle. In addition, the support determination section 26 determines an arrival time (Ta) for the subject vehicle A to arrive at the temporary halt position based on the present position information of the subject vehicle A, the information on the temporary halt position or the information of the signaling position, and the information on the velocity of the subject vehicle A. In addition, the temporary halt sign and marking, or the red traffic signal may be referred to as a danger target. Hereinafter, explanation is made for an example in which the safe driving support is divided into two steps of (i) Ta<=T1, and (ii) T1<Ta<=T2. In addition, the degree of the safe driving support decreases in order of the case of (i) Ta<=T1, which requires an alarm, and (ii) T1<Ta<=T2, which requires an attention-seeking. It is noted that T1 and T2 are values defined according to the brake stopping distance based on the vehicle velocity, and may be defined arbitrarily.

In addition, this explains an example to divide the degree of the danger into two steps of an attention-seeking and an alarm; however, there is no need to be limited thereto. For example, it may be divided into three steps of, from a lower in the degree of the safe driving support, the case requiring information presentation, the case requiring an attention-seeking, and the case requiring an alarm.

The information presentation control circuit 27 instructs the display device 21 or the audio output device 22 to perform a presentation of the information according to the determination result in the support determination section 26. For example, with respect to the collision prevention application, in the case of $\alpha<TTC<=\beta$ which requires an attention-seeking, a display sign of an attention-seeking is illustrated or displayed at a display portion of the display device 21 which corresponds to a direction of an obstacle. In the case of $TTC<=\alpha$ which requires an alarm, a display sign of an alarm is illustrated or displayed at a display portion of the display device 21 which corresponds to a direction of an obstacle. It is noted that together with the attention-seeking display sign or alarm display sign, a guidance sound or an alarm sound may be outputted via the audio output device 22.

In the collision prevention application, the attention-seeking display sign may be a display sign just to cause a driver to notice the existence of a danger of a collision between the subject vehicle A and an obstacle and urges the driver to perform a collision prevention driving operation. For example, the attention-seeking display sign in the collision prevention application may be a combination of a figuration of an intersection ahead of the subject vehicle A and a lighting-up display sign of an image indicating a positional relation between the subject vehicle A and the obstacle when the subject vehicle A enters the intersection. It may be a lighting-up display sign of an image indicating a direction in which the obstacle approaches the subject vehicle A. It may be a lighting-up display sign of a text for explaining the state of the obstacle against the subject vehicle A such as "the oncoming vehicle approaches from the right-hand side of the front intersection". It may be any combination of the above display signs. In addition, when displaying an image, an appearance of the obstacle may be illustrated, drawn, or symbolized.

In the collision prevention application, the alarm display sign may be a display sign just to cause a driver to notice the high degree of a danger of a collision between the subject vehicle A and an obstacle and urges the driver to perform a collision prevention driving operation. For example, the alarm display sign in the collision prevention application may emphasize or highlight the contents of the attention-seeking display sign by flashing it, i.e., in a flashing state. The emphasis may be also made by the text display making the alarm strengthened such as "danger of collision is existing".

In the above, a display portion of the display device 21 existing at a position corresponding to the direction of the obstacle signifies as follows. For example, when an obstacle approaches the subject vehicle A from the right-hand side, the relevant display portion in FIG. 3 corresponds to the display portion F in the right front face of the instrument panel arranged in the right side from the view of the driver's seat, and display portions I, J of the right pillar. In addition, when an obstacle such as a vehicle oncoming straight in the opposite direction approaches the subject vehicle A from the just front of the subject vehicle A, the relevant display portion corresponds to, the display portion E in a just front face of the instrument panel which is arranged in front of the driver's seat in FIG. 3, and the display portion M of the HUD. Further, the display portion C of the in-vehicle navigation apparatus 4, and the display portion D of the meter panel may be included in the display portion of the front one. Furthermore, when an obstacle approaches the subject vehicle A from the left-hand side, for example, the relevant display portion corresponds to display portions G, H in the left front face of the instrument panel arranged in the left side from the view of the driver's seat, and display portions K, L of the left pillar. It is noted that above explained display portions are only examples. A display portion of the display device 21 which exists in the position corresponding to the direction of the obstacle may be provided or arranged as needed based on the numbers or positions of the display portions of the display device 21 provided in the subject vehicle A.

In addition, the information presentation control circuit 27 may be designed so as to perform a display portion changeover to change display, portions of the display device 21 according to the movement direction of the obstacle. Furthermore, when the obstacle approaches the subject vehicle A from the right-hand side, for example, the attention-seeking display sign or the alarm display sign is displayed in the display device 21 to express the movement of the obstacle in a display portion changeover order of (i) the display portion J in the right pillar, (ii) the display portion I in the right pillar, (iii) the display portion F in the right front face of the instrument panel, and then (iv) the display portion E in the just front face of the instrument panel, as shown in an arrow N in FIG. 4.

In contrast, when the obstacle approaches the subject vehicle A from the left-hand side, for example, the attention-seeking display sign or the alarm display sign is displayed in the display device 21 to express the movement of the obstacle in a display portion changeover order of (i) the display portion K in the left pillar, (ii) the display portion L in the left pillar, (iii) the display portion G in the left front face of the instrument panel, and then (iv) the display portion H in the left front face of the instrument panel, as shown in an arrow O in FIG.

4. Such a display portion changeover order can allow a display expressing a movement of an obstacle; thus, the driver can be made to easily notice the attention-seeking display sign or the alarm display sign.

In addition, in the temporary halt failure prevention application, for example, in the case of T1<Ta<=T2 which requires the attention-seeking, the attention-seeking display sign is displayed on a display portion of the display device 21 which exists in the position corresponding to the direction of the temporary halt sign and marking, or the red traffic signal; in the case of Ta<=T1 which requires an alarm, the alarm display sign is displayed at a display portion of the display device 21 which exists in the position corresponding to the direction of the temporary halt sign and marking, or the red traffic signal. It is noted that together with the attention-seeking display sign or alarm display sign, a guidance sound or an alarm sound may be outputted via the audio output device 22.

In the temporary halt failure prevention application, the attention-seeking display sign may be a display sign just to cause a driver to notice the existence of a temporary halt position ahead of the subject vehicle A and urges the driver to perform a driving operation for the temporary halt. For example, the attention-seeking display sign in the halt failure prevention application may be a lighting-up display of an image indicating a temporary halt sign and marking or a red traffic signal ahead of the subject vehicle A. It may be a lighting-up display of a text notifying of necessity of a temporary halt such as "a temporary halt position ahead". It may be a combination of the above displays or display signs. In addition, when displaying an image, an appearance of the obstacle may be illustrated, drawn, or symbolized.

In addition, the alarm display sign in the temporary halt failure prevention application may be a display sign to cause a driver to notice that no braking operation poses a high possibility to result in failing in stopping at the temporary halt position and urges the driver to perform a driving operation for the temporary halt. For example, the alarm display sign in the temporary halt failure prevention application may emphasize or highlight the contents of the attention-seeking display sign by flashing it, i.e., in a flashing state. The emphasis may be also made by the text display making the alarm strengthened such as "temporary halt".

It is noted that a display portion of the display device 21 which exists in the position corresponding to the direction of the temporary halt sign and marking or the red traffic signal basically corresponds to the display portion E in a just front face of the instrument panel which is arranged in front of the driver's seat in FIG. 3, and the display portion M of the HUD. Further, the display portion C of the in-vehicle navigation apparatus 4, and the display portion D of the meter panel may be included in the display portions of the front position. In addition, when the temporary halt sign and marking, or the red traffic signal is ahead of a curve, a display portion of the display device 21 arranged on the right side or left side from the driver seat may be used. The above explained display portions are only examples. A display portion of the display device 21 which exists in the position corresponding to the direction of the obstacle may be provided or arranged as needed based on the numbers or positions of the display portions of the display device 21 provided in the subject vehicle A.

Herein, the information presentation control circuit 27 may be referred to as a display control circuit or device. In addition, the attention-seeking display sign or the alarm display sign may be referred to as safe driving support information, a safe driving support information display sign, or a safe, driving support information sign. The contents of the text in the attention-seeking display sign or the alarm display sign may be outputted as sounds via the audio output device 22 as an attention-seeking notice or guidance sound or an alarm notice or guidance sound.

The above each application defines a series of processes in each of the infrastructure information acquisition device 23, the vehicle information acquisition device 24, the navigation information acquisition device 25, the support determination section 26, the information presentation control circuit 27, the display device 21, and the audio output device 22. The application is prepared for every kind of safe driving support. The driver can select the application, which is to be used, via the operation switch group (unshown) etc. The operation switch group or the like may be an operation switch group, a speech input device, or a remote control of the in-vehicle navigation apparatus 4.

The input switch device 28 is a switch for inputting when the driver notices the attention-seeking display sign or the alarm display sign which is displayed in the display device 21. The input switch device 28 accepts an input made by the driver and outputs a signal for indicating that the input was accepted (hereinafter, also referred to driver action confirmation information). Herein, the input switch device 28 may be also referred to as an input means or device. In addition, the driver action confirmation information may be referred to as vehicle-inside information. The input switch device 28 may be provided as a steering switch, which is arranged at a position of the steering wheel. In addition, the input switch device 28 may be provided as any other switch which is already existing inside the subject vehicle A.

The action acquisition device 29 acquires the driver action confirmation information outputted from the input switch device 28. When the driver action confirmation information is outputted to the in-vehicle LAN 5 from the input switch device 28, the action acquisition device 29 acquires the driver action confirmation information via the in-vehicle LAN 5. When the driver action confirmation information is outputted to a dedicated line from the input switch device 28, the action acquisition device 29 acquires the driver action confirmation information via the dedicated line (see FIG. 2).

The action determination section 30 performs an action determination process to execute a determination as to whether a driver becomes aware of an attention-seeking display sign or an alarm display sign based on vehicle information acquired in the vehicle information acquisition device 24 or the driver action confirmation information acquired in the action acquisition device 29. In the case of detecting a sensor signal arising from a driving operation of the driver when noticing the attention-seeking display sign or alarm display sign displayed in the display device 21, the action determination section 30 determines that the driver noticed the attention-seeking display sign or the alarm display sign.

In a specific example, suppose the case where the application urges the driver to perform a braking operation. In such a case, it is determined that the driver noticed the attention-seeking display sign or the alarm display sign when a sensor signal which indicates that the brake is turned into an ON state is transmitted from the vehicle information acquisition device 24 as vehicle information.

Furthermore, the action determination section 30 also determines that the driver noticed the attention-seeking display sign or the alarm display sign when the driver action confirmation information is transmitted from the action acquisition device 29.

Further, based on the affirmative result from the determination by the action determination section 30, the information presentation control circuit 27 executes a display attenuation to change the attention-seeking display sign or the alarm display sign into an attenuation display, i.e., an attenuation display mode, which helps prevent the blocking of a visual field of the driver.

For example, in the collision prevention application, the action determination section 30 determines that the driver noticed the attention-seeking display sign or the alarm display sign, and the support determination section 26 determines that neither the attention-seeking display sign nor the alarm display sign is needed based on infrastructure information (there is no danger of any collision). In such a case, the information presentation control circuit 27 executes or makes a determination to perform the attenuation display; thus, the display mode of the attention-seeking display sign or the alarm display sign is changed into the attenuation display mode. In addition, in the temporary halt failure prevention application, when the action determination section 30 determines that the driver noticed the attention-seeking display sign or the alarm display sign, the information presentation control circuit 27 makes determination to perform the attenuation display; thus, the display mode of the attention-seeking display sign or the alarm display sign is changed into the attenuation display mode.

It is noted that the attenuation display mode only needs to be inconspicuous or not highlighted compared with an original display mode. For instance, the following can be adopted: reduction in the size of the display sign to change to the display sign smaller than the original one; reduction in the brightness of the display sign to change to the brightness lower than the original one; reduction in the chroma saturation of the display sign to change to the chroma saturation lower than the original chroma saturation; or reduction in the lightness of the display sign to change to the lightness lower than the original one.

In addition, the attention-seeking display sign is displayed in yellow or orange color while the alarm display sign is displayed in red color. That is, the color hue of the display is changed from an original color hue of a warm color hue into an attenuated or inconspicuous color hue of a cold color hue such as green or blue. Furthermore, the figuration of the display is changed from an original one of a complicated figuration into an attenuated or inconspicuous one of a simplified icon. Furthermore, an original display sign with an icon and text is changed into an attenuated or inconspicuous one with only an icon. Furthermore, an original display sign of a text is changed into an attenuated or inconspicuous one of an icon. That is, a simplification of a display sign is made from an original display sign into an attenuated or inconspicuous one simpler than the original one.

As another example of the simplification, when the determination result by the action determination section 30 is affirmative, the display sign may be changed into an agent type icon (refer to FIG. 5) which answers "thank you" etc. When the driving operation, which the driver is urged to perform using the attention-seeking display sign or the alarm display sign, is executed, a response is interactively made from the vehicle side according to the executed driving operation; thus, the driving pleasure of the driver is increased and the comfort in ride is improved.

Furthermore, the attenuation display may include a display position change (i.e., a display portion change). That is, out of several display portions of the display device 21, a display sign is moved to a display portion that exists in a position which is harder to be seen from the driver. As a specific example, the display sign may be moved to a display portion of the display device 21 which is located more distant from the front area of the driver. For instance, when a display sign is initially displayed on the display portion E in a just front face of the instrument panel arranged in front of the driver's seat in FIG. 3, the display sign may be moved to the display portion K, L in the left pillar, or the display portion I, J in the right pillar.

In contrast, the information presentation control circuit 27 changes the attention-seeking display sign or the alarm display sign into a highlight display, i.e., a highlight display mode, which makes a display sign conspicuous for the driver when the action determination section 30 does not make affirmative determination. The display conspicuous for the driver needs to be just more conspicuous than an initial or original display sign. For example, the display sign is changed into one having a size larger than that of the initial one; the display sign is changed into one which is flashing.

Figure 6:
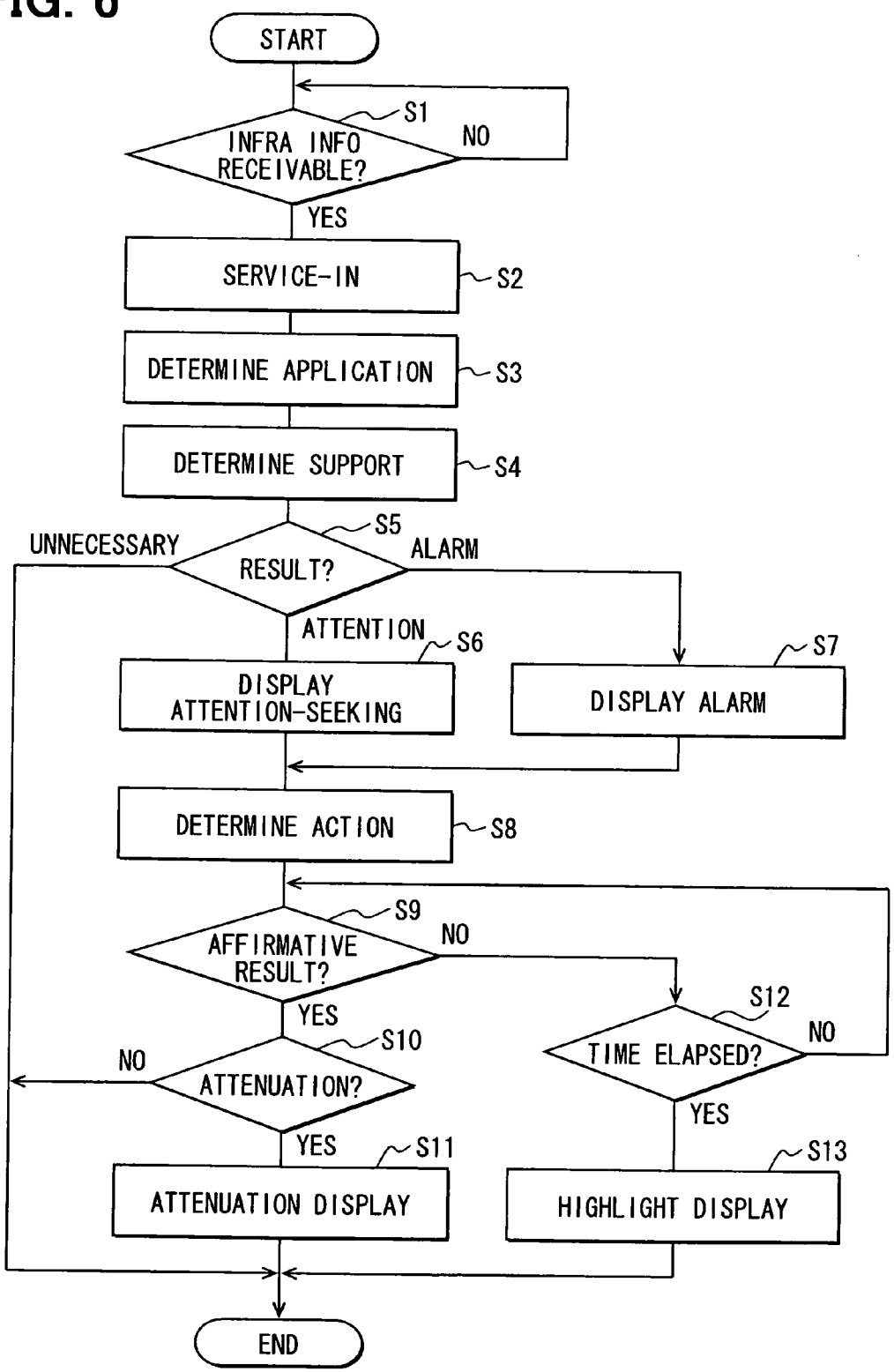
FIG. 6 is a flowchart diagram for illustrating an attenuation display process in the information presentation apparatus.

Next, with reference to FIG. 6, explanation is made for an operation flow of an attenuation display process executed by the information presentation apparatus 2. FIG. 6 is a flowchart diagram for illustrating an attenuation display process in the information presentation apparatus 2. It is noted that the present flow is started when the ignition switch of the subject vehicle A is turned into an ON state, for example.

It is further noted that a flowchart or the processing of the flowchart in the present application includes sections (also referred to as steps), which are represented, for instance, as S1. Further, each section can be divided into several subsections while several sections can be combined into a single section. Furthermore, each of thus configured sections can be referred to as a means or unit and achieved not only as a software device but also as a hardware device.

First, at S1, the infrastructure information acquisition device 23 determines whether it is possible to receive infrastructure information. It is noted that the infrastructure information acquisition device 23 may be designed to just determine that it is possible to receive infrastructure information when establishing communications with the roadside apparatus 1 or the in-vehicle communications apparatus 3. When it is determined that it is possible to receive infrastructure information (S1: YES), the processing moves to S2. In addition, when it is not determined that it is possible to receive infrastructure information (S1: NO), S1 is repeatedly executed.

At S2, while the information presentation control circuit 27 causes the display device 21 to display a service-in sign, the infrastructure information acquisition device 23 acquires infrastructure information. The processing moves to S3. Here, the service-in sign indicates that the subject vehicle A enters an area where infrastructure information is available or can be used.

At S3, based on the infrastructure information which the infrastructure information acquisition device 23 acquired, the support determination section 26 selects an application which can be used, and determines the application to execute. The processing moves to S4. When applications to be used are previously appointed by the driver, the application which can be used at the present time is selected and determined from the previously appointed applications.

At S4, the support determination section 26 executes the above-mentioned support determination process about the determined application. The processing then moves to S5. When the information presentation control circuit 27 determines that either the attention-seeking display sign or the alarm display sign is not necessary at S5 as a result of the support determination process (S5: "UNNECESSARY"), the flow is ended without executing any display in the display device 21. In the collision prevention application, in the case of $\beta<TTC$, the information presentation control circuit 27 determines that either the attention-seeking display sign or the alarm display sign is not necessary. In contrast, in the temporary halt failure prevention application, in the case of T2<Ta, the information presentation control circuit 27 determines that either the attention-seeking display sign or the alarm display sign is not necessary.

In addition, when it is determined that either the attention-seeking display sign or the alarm display sign is necessary (S4: ATTENTION), the processing moves to S6. In the collision prevention application, in the case of $\alpha$<TTC<=$\beta$, the information presentation control circuit 27 determines that the attention-seeking display sign is necessary. In contrast, in the temporary halt failure prevention application, in the case of T1<Ta<=T2, the information presentation control circuit 27 determines that the attention-seeking display sign is necessary.

Furthermore, when the information presentation control Circuit 27 determines that the alarm display sign is necessary (S5: ALARM). In the collision prevention application, in the case of TTC<=$\alpha$, the information presentation control circuit 27 determines that the alarm display sign is necessary. In contrast, in the temporary halt failure prevention application, in the case of Ta<=T1, the information presentation control circuit 27 determines that the alarm display sign is necessary.

At S6, the information presentation control circuit 27 causes the display device 21 to display an above-mentioned attention-seeking display to the display device 21, and moves to S8. In addition, at S7, the information presentation control circuit 27 causes the display device 21 to display the above-mentioned alarm display sign; the processing then moves to S8.

At S8, the action determination section 30 executes the above-mentioned action determination process. The processing then moves to S9. At S9, when the action determination section 30 makes an affirmative determination, i.e., obtains an affirmative result of the determination (S9: YES), the processing moves to S10. Further, at S9, when the action determination section 30 does not make an affirmative determination (S9: NO), the processing moves to S12.

At S10, when the information presentation control circuit 27 makes the determination to execute an attenuation display (S10: YES), the processing moves to S11. In addition, when the information presentation control circuit 27 does not make the determination to execute an attenuation display (S10: NO), the display or display mode by the display device 21 is continued as it is; the flow is ended. At S11, the information presentation control circuit 27 changes the attention-seeking display sign or alarm display sign which is displayed by the display device 21 to the attenuation display or attenuation display mode, and the flow is ended.

In addition, at S12, the information presentation control circuit 27 determines whether a predetermined time period elapses since the attention-seeking display sign or alarm display sign is displayed. It is noted that the above predetermined time period sufficiently covers a time period from when the attention-seeking display sign or the alarm display sign is displayed to when a typical driver notices the foregoing display sign to thereby execute an operation which is urged to perform by the display sign. For example, the predetermined time period may be designated as needed, for instance, several seconds. When it is determined that the predetermined time period elapses (S12: YES), the processing moves to S13. In addition, when it is not determined that the predetermined time period elapses (S12: NO), the processing returns to S9 for the repetition. At S13, the information presentation control circuit 27 changes the attention-seeking display sign or alarm display sign in the display device 21 from the present display mode to the conspicuous display mode, i.e., the highlight display mode, which displays the display sign more conspicuously for the driver: then, the flow is ended.

An aspect of the above process in FIG. 6 may be set forth as a method for presenting a driver in a vehicle with a driving support information notice. The method comprises: acquiring infrastructure information using at least one of vehicle-to-vehicle communications and road-to-vehicle communications; detecting an attention target ahead of the vehicle, the attention target to which the driver needs to pay attention based on the acquired infrastructure information; selecting a driving support application based on the detected attention target: starting a notice presentation to present the driver with a driving support information notice associated with the selected driving support application in an initial presentation mode in a visible presentation manner or an audible presentation manner; executing a driver awareness determination as to whether the driver is aware of the driving, support information notice based on vehicle-inside information, wherein the vehicle-inside information is a signal arising from an operation executed by the driver when the driver becomes aware of the presented driving support information notice; and executing, when an affirmative result is obtained from the executed driver awareness determination, one of (i) a presentation stoppage and (ii) a presentation attenuation of the driving support information notice, the presentation stoppage stopping the started notice presentation, the presentation attenuation executing a presentation mode changeover to change a presentation mode of the driving support information notice from the initial presentation mode into an attenuation presentation mode, the attenuation presentation mode reducing, compared with the initial presentation mode, a blockage against the driver during driving the vehicle towards the attention target.

The subsequent processing in FIG. 6 may be variously executed. In the case that the display mode of the attention-seeking display sign is changed into the attenuation display mode, the following processing returns to S7 and its subsequent ones when a time to display the alarm display sign comes. In addition, in the temporary halt failure prevention application, a danger target (i.e., a temporary halt sign and marking, or red traffic signal, herein) does not move, and the vicinity situation does not easily change. In such a case, after passing through the already detected danger target, the processing may return to S1 to repeat the flow. In contrast, in the collision prevention application, a danger target (i.e., a vehicle or a pedestrian, herein) may move, and the vicinity situation may easily change. In such a case, the processing may return to S4 to finely respond to the vicinity circumstance which has a tendency to change.

In the above configuration, when the driver notices the attention-seeking display sign or alarm display sign which is displayed in the display device 21, the driver performs a manipulation of the input switch device 28 or a predetermined driving operation. Based on such driver action confirmation information or vehicle information, it is determined whether the driver becomes aware of an attention-seeking display sign or an alarm display sign. In order to determine the presence or absence of the driving operation, it is unnecessary to provide a newly added apparatus like a driver sight line direction detection device. Therefore, it is not necessary to secure the space which accommodates the above-mentioned new added apparatus in the vehicle, makes the configuration easy. Further, the useless cost of installation of the newly added apparatus can be removed.

In the above configuration, it is first determined whether the driver becomes aware of an attention-seeking display sign or an alarm display sign; then, based on the affirmative result of the determination, the display mode of the attention-seeking display sign or the alarm display sign is changed into the attenuation display mode. This can prevent the driver from feeling botheration because of the display sign continued in the mode as it is regardless of the driver having recognized. Therefore, the above configuration helps prevent the comfort in ride for the driver from being spoiled.

When the driver does not perform a driving operation indicated by the attention-seeking display sign or the alarm display sign, a possibility of a danger of an accident may increase. When an affirmative result of the determination is not made by the action determination section 30 according to the above configuration, the display mode of the attention-seeking display sign or the alarm display sign is changed to the highlight display mode. When a possibility of a danger of an accident is high, the display mode of the attention-seeking display sign or the alarm display sign can be changed into the emphasized mode. Therefore, the above configuration can help prevent certainly the accident from occurring.

It is noted that the information presentation apparatus 2 according the embodiment of the present invention can apply to various applications about safe driving supports of vehicles. The following explains some examples.

First, it can apply to a temporary halt oversight prevention application, where the information presentation apparatus 2 detects a temporary halt sign and marking ahead of the vehicle based on infrastructure information, wherein the temporary halt sign and marking needs to be noticed by the driver. An attention-seeking display or alarm display is executed according to an arrival time of the subject vehicle A up to the temporary halt point defined by the detected halt sign and marking. It is noted that the temporary halt oversight prevention application belongs to the above-mentioned temporary halt failure prevention application.

Figure 7:
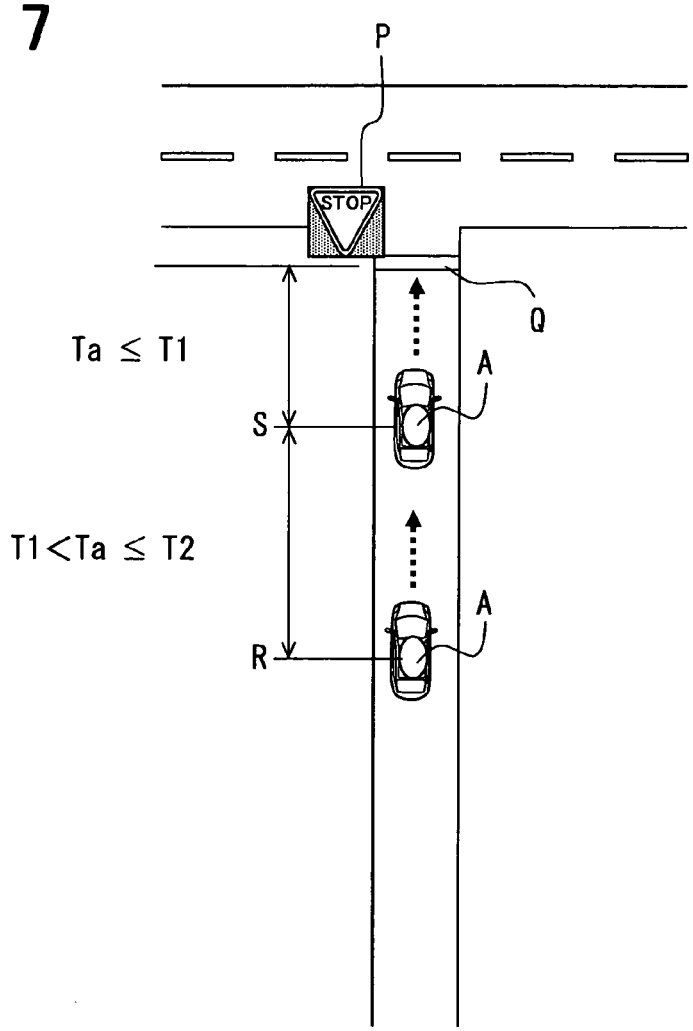
FIG. 7 is a diagram for explaining a temporary halt oversight prevention application.

Such a temporary halt oversight prevention application is explained with reference to FIG. 7. It is noted that in FIG. 7, a temporary halt sign P and a temporary halt line (i.e., marking) Q exist ahead of the vehicle A. In addition, an arrival time Ta is a time period necessary for the vehicle A to reach the temporary halt point (i.e., the temporary halt line Q). When the vehicle A running is located at a position indicated by R in FIG. 7, an arrival time Ta is T2; when the vehicle A running is located at a position indicated by S in FIG. 7, an arrival time Ta is T1. Thus, when the vehicle running is in between R and S, the relation of T1<Ta<=T2 is satisfied; when the vehicle running is in between S and Q, the relation of Ta<=T1 is satisfied.

Figure 8:
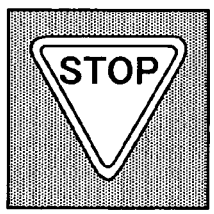
FIG. 8 is a diagram illustrating an example of a display sign in the display device.

When the vehicle A running is in a road range from R just before S, T1<Ta<=T2 is satisfied. The information presentation apparatus 2 thus executes an attention-seeking notice. For example, in the attention-seeking notice, a temporary halt sign in FIG. 8 is displayed as an attention-seeing display sign in a lighting-up state or manner in the display device 21 using the display portion E of the just front face of the instrument panel or the display portion M of the HUD (refer to FIG. 3). Further, simultaneously, an audio guidance sound such as "a temporary halt point is existing ahead" is sounded.

When the vehicle A running is in a road range from S just before Q, Ta<=T1 is satisfied. The information presentation apparatus 2 thus executes an alarm notice. For example, in the alarm notice, a temporary halt sign in FIG. 8 is displayed as an alarm display sign in a lighting-up state or manner in the display device 21 using the display portion E of the just front face of the instrument panel or the display portion M of the HUD (refer to FIG. 3). Further, simultaneously, an audio guidance sound such as "reaching a temporary halt point" is sounded.

Figure 9:
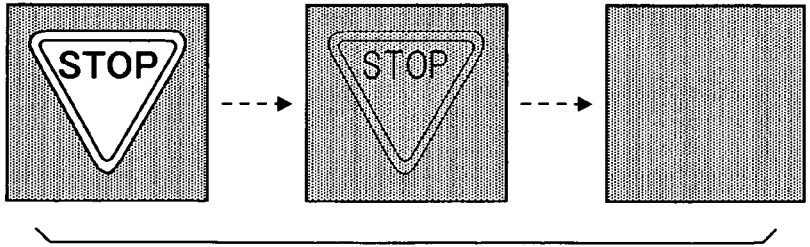
FIG. 9 is a diagram for explaining an attenuation display.
Figure 10:
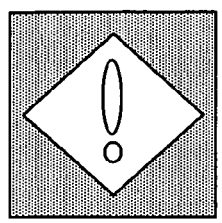
FIG. 10 is a diagram illustrating an example of a display sign in an attenuation display in the display section.

Furthermore, when acquiring the vehicle information indicating the brake having been in an ON state or the accelerator opening degree having been in a zero degree, the information presentation apparatus 2 determines that the driver noticed the attention-seeking display sign or the alarm display sign, thereby changing the display mode of the attention-seeking display sign or the alarm display sign into the attenuation display mode. For example, in the attenuation display mode, the brightness of the temporary halt sign is decreased step by step as indicated in FIG. 9. In addition, the temporary halt sign may be changed into a simplified icon so as to only indicate a notice as indicated in FIG. 10.

In contrast, when it is not determined that the driver becomes aware of an attention-seeking display sign or an alarm display sign, the display mode may be changed into a more conspicuous display mode, i.e., the highlight display mode, in which the attention-seeking display sign or alarm display sign is flashing.

Further, the information presentation apparatus 2 can apply to a red traffic signal oversight application as follows. The information presentation apparatus 2 detects a red traffic signal ahead of the vehicle based on infrastructure information, wherein the red traffic signal needs to be noticed by the driver. Based on the detected red traffic signal, an arrival time to reach a predetermined temporary halt point at the signal is calculated. According to the calculated arrival time, the attention-seeking display or alarm display may be performed. It is noted that the red traffic signal oversight prevention application belongs to the above-mentioned temporary halt failure prevention application. In addition, in the present read traffic signal oversight prevention application, a red traffic signal may be illustrated as an attention-seeking display sign or alarm display sign.

Furthermore, the information presentation apparatus 2 can apply to other applications as follows. In one application, the information presentation apparatus 2 detects an accident occurrence point ahead of the vehicle based on infrastructure information, wherein the accident occurrence point needs to be noticed by the driver. An arrival time to reach the detected accident occurrence point is calculated; based on the calculated arrival time, an attention-seeking display or alarm display is executed. In one application, an attention-seeking display or alarm display can be executed according to an arrival time for the subject vehicle to reach a two-direction-alternate point at which two different traffic directional travels are alternately permitted. It is noted that, in those applications, the attention-seeking display or alarm display may indicate the existence of the accident occurrence point or the two-direction-alternate point ahead of the subject vehicle, by using a drawing or a text. Further, in those applications, when acquiring the vehicle information which indicates the brake having turned into an ON state or the deceleration of the vehicle, the information presentation apparatus 2 determines that the driver noticed the attention-seeking display sign or the alarm display sign, thereby changing the display mode of the attention-seeking display sign or the alarm display sign into the attenuation display mode.

Figure 11:
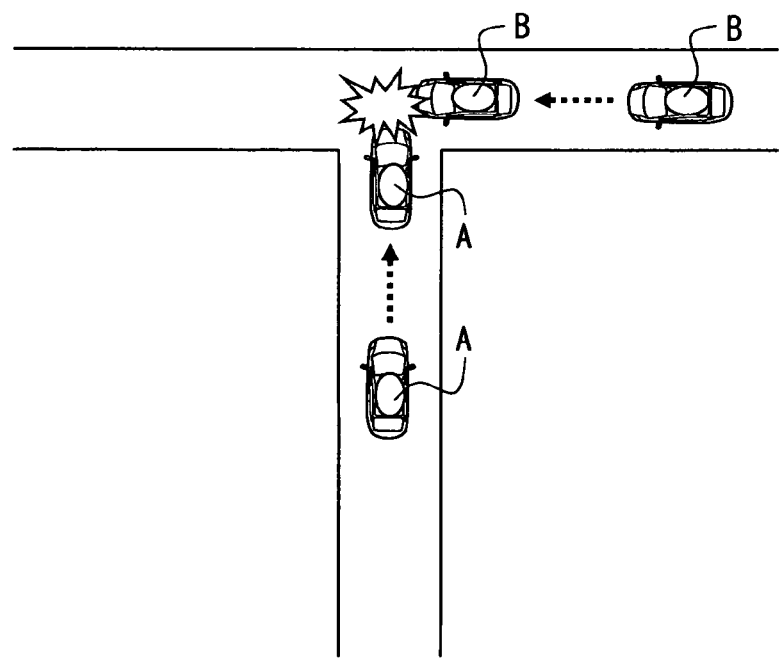
FIG. 11 is a diagram for explaining an upon-meeting collision prevention application.

Furthermore, the information presentation apparatus 2 may apply to an encounter collision prevention application (also referred to as an upon-meeting collision prevention application) as follows. Based on infrastructure information, the information presentation apparatus 2 detects an obstacle providing a danger that the subject vehicle A collides upon meeting suddenly at an intersection ahead of it. According to the degree of the danger of the collision with the detected obstacle, an attention-seeking display or alarm display is executed. It is noted that the above encounter collision prevention application belongs to the above-mentioned collision prevention application. Such an application is explained with reference to FIG. 11 in which a counterpart vehicle B approaches from the right side of the subject vehicle A.

Figure 12:
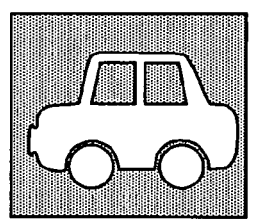
FIG. 12 is a diagram illustrating an example of a display sign in the display device.

The information presentation apparatus 2 executes an attention-seeking notice when TTC (Time To Collision) about the vehicle A and the vehicle B is within a range of $\alpha < TTC <= \beta$. For example, the attention-seeking notice may include an attention-seeking display sign of a vehicle-shaped icon symbolizing an appearance of the vehicle B, as shown in FIG. 12. The icon is displayed in the display device 21 such that it is displayed in an orange-colored flashing state in one display portion of the display portions I, J in the right pillar, and the display portion F in the right front face of the instrument panel (refer to FIG. 3). Further, the attention-seeking notice may include an attention-seeking guidance sound such as "a vehicle is approaching from the right."

Further, the information presentation apparatus 2 executes an alarm notice when TTC (Time To Collision) about the vehicle A and the vehicle B is within a range of $TTC <= \alpha$. For example, the alarm notice may include an alarm display sign of a vehicle-shaped icon symbolizing an appearance of the vehicle B, as shown in FIG. 12. The icon is displayed in the display device 21 such that it is displayed in a red-colored flashing state in one display portion of the display portions I, J in the right pillar, and the display portion F the right front face of the instrument panel (refer to FIG. 3). Further, the alarm notice may include an alarm guidance sound such as "a danger of collision is existing."

Furthermore, when the vehicle B approaches the subject vehicle A from the right-hand side, for example, the attention-seeking display sign or the alarm display sign is displayed in the display device 21 to express the movement of the vehicle B in a display portion changeover order of (i) the display portion J in the right pillar, (ii) the display portion I in the right pillar, (iii) the display portion F in the right front face of the instrument panel, and then (iv) the display portion E in the just front face of the instrument panel.

In addition, when the display device 21 is only arranged at a single display portion which is located in front of the driver seat, an attention-seeking display or alarm display may be executed only in the single display portion located in front of the driver seat.

Furthermore, when acquiring the vehicle information which indicates that the brake is turned into an ON state, the information presentation apparatus 2 determines that the driver noticed the attention-seeking display/notice or the alarm display/notice. In addition, the information presentation apparatus 2 determines whether it is unnecessary to execute an attention-seeking display or an alarm display based on infrastructure information. When determining that the driver becomes aware of an attention-seeking display or an alarm display and determining that it is unnecessary to execute an attention-seeking display nor an alarm display, the information presentation apparatus 2 changes the display mode of the attention-seeking display sign or the alarm display sign into the attenuation display mode.

For example, in the attenuation display mode, only an icon which suggests the driver to pay attention to it (refer to FIG. 10) is substituted as a display sign and displayed only in the display portion I or the display portion J in the right pillar.

In contrast, when it is not determined that the driver becomes aware of an attention-seeking display sign or an alarm display sign, the display mode may be changed into a more conspicuous display mode, i.e., the highlight display mode, in which the attention-seeking display sign or alarm display sign is displayed in a flashing state or manner.

Furthermore, the information presentation apparatus 2 may apply to a right-turn collision prevention application in the left-hand traffic as follows. First, suppose the state that the subject vehicle A is waiting at an intersection to turn to the right. The information presentation apparatus 2 detects either a going-straight oncoming vehicle B, T (see FIG. 13) or a pedestrian crossing a crosswalk U (see FIG. 13), as an obstacle that has a risk to collide with the subject vehicle A. Herein, the going-straight oncoming vehicle may be a vehicle B or a two-wheeled vehicle T under a road traffic law; the pedestrian crossing a crosswalk U may be a pedestrian or a light cart carrying a person under a road traffic law. The information presentation apparatus 2 executes an attention-seeking display or an alarm display according to the degree of the danger of the collision with the detected obstacle. It is noted that the above right-turn collision prevention application in the left-hand traffic belongs to the above-mentioned collision prevention application.

It is noted that the above configuration applies to the left-hand traffic like in Japan, UK. In this regard, however, the equivalent configuration can be naturally apply to the right-hand traffic in the US, Germany. In other words, the information presentation apparatus 2 may apply to a left-turn collision prevention application in the right-hand traffic, equivalently.

It is noted that, as indicated in FIG. 13, the subject vehicle A is waiting for the right-turn in the left-hand traffic, whereas the vehicle B exists in the opposite lane as the oncoming vehicle against the vehicle A. In addition, the two-wheeled vehicle T exists in the dead angle of the vehicle B in the forward direction of the vehicle A. In addition, the pedestrian U exists in the crosswalk at the right of the vehicle A.

In $\alpha < TTC <= \beta$, the information presentation apparatus 2 executes an attention-seeking notice about the corresponding obstacle. It is noted that the above TTC (Time To Collision) is calculated based on each of TTC between the vehicle A and the vehicle B, TTC between the vehicle A and the two-wheeled vehicle T, and TTC between the vehicle A and the pedestrian U. As an example, if the obstacle is the vehicle B, an attention-seeking notice may include an attention-seeking display sign of a vehicle-shaped icon symbolizing the vehicle B, as shown in FIG. 12, at the display portion M (refer to FIG. 3) of the HUD as the display device 21 in an orange-colored lighting-up state. Further, the attention-seeking notice may include an attention-seeking guidance sound such as "a heading-straight oncoming vehicle is approaching."

In addition, when the obstacle is the two-wheeled vehicle T, the attention-seeking notice may include an attention-seeking display sign which is a two-wheeled-vehicle icon symbolizing an appearance of the two-wheeled vehicle T. The icon is displayed as an attention-seeking display sign in the display device 21 such that it appears in an orange-colored lighting-up state in the display portion E (refer to FIG. 3) in the front face of the instrument panel. Further, the attention-seeking notice may include an attention-seeking guidance sound such as "a heading-straight two-wheeled vehicle is approaching." Furthermore, when the obstacle is a pedestrian U, the attention-seeking notice may include an attention-seeking display sign which is a pedestrian-shaped icon symbolizing the pedestrian U. The icon is displayed as an attention-seeking display sign in the display device 21 such that it appears in an orange-colored lighting-up state in one of the display portions of the display portion F in the right front face of the instrument panel, the display portions I, J in the right pillar (refer to FIG. 3). Further, the attention-seeking notice may include an attention-seeking guidance sound such as "a pedestrian is crossing a crosswalk." When there are existing several obstacles each of which requires an attention-seeking display. The attention-seeking display signs are displayed simultaneously for those several obstacles.

Further, in TTC<=α, the information presentation apparatus 2 executes an alarm notice about the corresponding obstacle. It is noted that the above TTC (Time To Collision) is calculated based on each of TTC between the vehicle A and the vehicle B, TTC between the vehicle A and the two-wheeled vehicle T, and TTC between the vehicle A and the pedestrian U, similarly. In such a case, each alarm notice may include an alarm display sign or alarm guidance sound similar to that explained above.

When both a heading-straight vehicle and a pedestrian crossing a crosswalk are detected as obstacles, it is desirable that both the display of the heading-straight vehicle and the display of the pedestrian crossing a crosswalk are displayed in a display portion of the display device 21 which exists in the position corresponding to the direction of the heading-straight vehicle. For example, an attention-seeking display or alarm display about the heading-straight vehicle is executed in the display portion M of the HUD. At the same time, an attention-seeking display or alarm display of the pedestrian crossing a crosswalk is executed in the display portion E in the front face of the instrument panel. Under such a configuration, even if there are existing several obstacles, the driver needs to see or check only attention-seeking display or alarm display in the single direction, i.e., a front direction ahead of the driver seat. This can allow a driver to perform a driving operation with a margin or time allowance.

Furthermore, when acquiring the vehicle information which indicates that the brake is turned into an OFF state, the information presentation apparatus 2 determines that the driver performs the start-off of the vehicle after (i) noticing the attention-seeking display or the alarm display and (ii) confirming the obstacle. In addition, the information presentation apparatus 2 determines whether it is unnecessary to execute an attention-seeking display or an alarm display based on infrastructure information. When determining that the driver becomes aware of an attention-seeking display or an alarm display and determining that it is unnecessary to execute an attention-seeking display nor an alarm display, the information presentation apparatus 2 changes the display mode of the attention-seeking display sign, or the alarm display sign into the attenuation display mode. For example, in the attenuation display mode, the display sign may be changed into an icon which suggests the driver only to pay attention (refer to FIG. 10).

In contrast, when it is determined that execution of an attention-seeking display or an alarm display is necessary, the display mode may be changed into a more conspicuous display mode, i.e., into the highlight display mode, in which the attention-seeking display sign or alarm display sign is displayed in a flashing state or manner.

In addition, suppose the case that two or more kinds of attention-seeking display signs or the alarm display signs are displayed over several display portions of the display device 21. In such a case, each time the action determination section 30 makes, in an order, individual determinations to result in changing to the attenuation display with respect to the individual display signs, the attenuation display can be applied to the individual display signs in the order corresponding to the order of the individual determinations which are made serially. The following explains one example where there are existing the above-mentioned two-wheeled vehicle T and the pedestrian U. The attention-seeking display is made to display a two-wheeled vehicle type icon in the display portion E of the display device 21 in the front face of the instrument panel; simultaneously, the attention-seeking display is made to display a pedestrian type icon in the display portion F of the display device 21 in the right front face of the instrument panel.

First, when it is determined that the driver of the vehicle A turns the brake into an OFF state and starts the vehicle A after confirming that the two-wheeled vehicle T going straight passes through, the display mode of the attention-seeking display about the two-wheeled vehicle T changes to the attenuation display mode. Then, when the pedestrian U is still passing through the pedestrian crosswalk, the attention-seeking display (or alarm display) about the pedestrian U continues. At this time, the vehicle A stops again. Then, when it is determined that the driver turns the brake into the OFF state and re-starts the vehicle A slowly after confirming that the pedestrian finishes passing through the pedestrian crosswalk, the attention-seeking display about the pedestrian U changes to the attenuation display; i.e., the display mode of the attention-seeking display about the pedestrian U changes into the attenuation display mode.

Under such a configuration, the attention-seeking displays or alarm displays change into the attenuation displays in an order from one whose necessity of making the driver recognize becomes low. In the above configuration, while only the attention-seeking display or alarm display with high necessity of making the driver notice remains as needed according to the varying status, the driver can be appropriately made to recognize only the attention-seeking display or alarm display necessary for the driver in each status.

Furthermore, the information presentation apparatus 2 may apply to a left-turn entanglement prevention application in the left-hand traffic as follows. Based on infrastructure information, the information presentation apparatus 2 detects an obstacle providing a danger that the subject vehicle A entangles and collides with a two-wheeled vehicle straight heading in the left side of the subject vehicle at a left turn at an intersection in the left-hand traffic. According to the degree of the danger of the collision with the detected obstacle, an attention-seeking display or alarm display is executed. In addition, in the left-turn entanglement prevention application, the attention-seeking display or alarm display may be made to display a two-wheeled vehicle type icon, for example, as illustrated in FIG. 14, in one of the display portions K, L of the display device 21 in the left pillar (refer to FIG. 3). It is noted that the above left turn entanglement prevention application in the left-hand traffic belongs to the above-mentioned collision prevention application.

It is noted that the above configuration applies to the left-hand traffic like in Japan, UK. In this regard, however, the equivalent configuration can be naturally apply to the right-hand traffic in the US, Germany. In other words, the information presentation apparatus 2 may apply to a right-turn entanglement prevention application in the right-hand traffic, equivalently.

Furthermore, the information presentation apparatus 2 may apply to a lane-changing/merging collision prevention application as follows. Based on infrastructure information, the information presentation apparatus 2 detects as an obstacle a vehicle at the left/right rear side of the subject vehicle A providing a danger that the subject vehicle A collides at the time of lane changing or lane merging. According to the degree of the danger of the collision with the detected obstacle, an attention-seeking display or alarm display is executed. In addition, in the lane changing/merging prevention application, an attention-seeking display or an alarm display may be made to display a vehicle type icon as indicated in FIG. 12 in the display portion of the display device 21 which exists in the direction at which the vehicle perform lane changing or merging. It is noted that the above lane changing/merging collision prevention application belongs to the above-mentioned collision prevention application.

In addition, the information presentation apparatus 2 may apply to another application as follows. Based on infrastructure information, the information presentation apparatus 2 detects a distance with a preceding vehicle which precedes the subject vehicle A, and executes an attention-seeking display or alarm display according to the detected distance between the two vehicles. In addition, in the above application, an attention-seeking display or an alarm display may be made to display an image and/or a text which urges a driver of the subject vehicle A to broaden the inter-vehicle distance with the preceding vehicle in a display portion of the display device 21. Further, when acquiring the vehicle information which indicates the brake having turned into an ON state or the deceleration of the vehicle, the information presentation apparatus 2 determines that the driver noticed the attention-seeking display sign or the alarm display sign, thereby changing the display mode of the attention-seeking display sign or the alarm display sign into the attenuation display mode.

Further, when infrastructure information cannot be received by the infrastructure information acquisition device 23, or when the received infrastructure information has an error, the infrastructure information is accurately unacquirable. Thereby, it is not expectable to accurately determine the necessity of the execution of the support determination process or attenuation display. In such a case, an attention-seeking display or alarm display may be continued for a predetermined time period. Then, after the predetermined time period elapses, the display mode of the attention-seeking display or alarm display may be changed into the attenuation display mode preferentially or compulsorily.

Further, when vehicle information cannot be received by the vehicle information acquisition device 24, or when the received vehicle information has an error, the vehicle information is accurately unacquirable. Thereby, it is not expectable to accurately determine the necessity of the execution of the support determination process, action determination process, or attenuation display. In such a case, an attention-seeking display or alarm display may be continued for a predetermined time period. Then, after the predetermined time period elapses, the display mode of the attention-seeking display or alarm display may be changed into the attenuation display mode preferentially or compulsorily.

It is noted that the above predetermined time period sufficiently covers a time period from when the attention-seeking display sign or the alarm display sign is displayed to when a typical driver notices the foregoing display sign to thereby execute an operation which is urged to perform by the display sign. For example, the predetermined time period may be designated as needed, for instance, several seconds.

The above configuration can provide the following advantage: even when accurate infrastructure information or vehicle information cannot be used, the driver can be prevented from feeling botheration because of the display sign continued in the mode as it is regardless of the driver having already recognized.

In addition, the above-mentioned embodiment indicates that the display device 21 includes several display portions; however, the display device 21 does not need to be limited thereto. For example, the display device 21 may be provided with a single display portion. In this case, the single display portion of the display device 21 or the area of the single display portion of the display device 21 may be divided into several sectional display sub-areas. By using such several sectional display sub-areas, similarly to the display manner in the case that the display device 21 has several display portions, the direction at which the obstacle exists or the movement of the obstacle can be expressed.

In the above embodiment, the infrastructure information can be acquired by the information presentation apparatus 2 via either the road-to-vehicle communications or vehicle-to-vehicle communications; however, without need to be limited thereto, it can be differently acquired. For example, the information presentation apparatus 2 may acquire the infrastructure information only via the road-to-vehicle communications. The information presentation apparatus 2 may acquire the infrastructure information only via the vehicle-to-vehicle communications.

In addition, in the above-mentioned embodiment, it is determined whether the driver noticed the attention-seeking display or alarm display based on the input by the driver via the input switch device 28. However, there is no need to be limited thereto. For example, the information presentation apparatus 2 may not be provided with the input switch device 28 and the action acquisition device 29. In this case, based on only the vehicle information acquired by the vehicle information acquisition device 24, it can be determined whether the driver of the subject vehicle noticed the attention-seeking display or alarm display.

In addition, the above-mentioned embodiment indicates the configuration of having the attenuation display mode; however, it does not need to be limited thereto. For example, instead of using the attenuation display, stopping the display (i.e., stopping of the attention-seeking display or alarm display) can prevent the driver's visual field from being blocked. In addition, after the attenuation display mode, erasing of the display sign can be adopted, thereby preventing the visual field of the driver from being blocked.

It is noted that the present invention is not limited to above-mentioned each embodiment. Various modifications can be made within a scope recited in claims. The technical scope of the present invention includes an embodiment obtained by combining suitably the technical means disclosed individually in the different embodiments.

Aspects of the disclosure described herein are set out in the following clauses.

As an aspect of the disclosure, an information presentation apparatus in a vehicle is provided as follows. A display control circuit is configured to cause a display device to display a safe driving support information sign, which urges a driver of the vehicle to perform a driving operation responding to processing of a safe driving support application to support a safe driving of the vehicle. An action determination section is configured to execute a driver awareness determination as to whether the driver is aware of the safe driving support information sign. The display control circuit is further configured to, based on an affirmative result of the driver awareness determination obtained by the action determination section, cause the display device to execute a display erasure or a display attenuation of the driving support information sign, the display erasure stopping the displaying of the safe driving support, information sign, the display attenuation executing a display mode changeover to change a display mode of the safe driving support information sign into an attenuation display mode, which helps prevent a blockage of a visual field of the driver. The action determination section is further configured to execute the driver awareness determination based on vehicle-inside information which includes a signal arising from an operation executed by the driver when the driver becomes aware of the safe driving support information sign displayed by the display device.

As an optional aspect, the action determination section may be further configured to execute the driver awareness determination based on vehicle-inside information, which includes a sensor signal arising from a driving operation executed by the driver when the driver becomes aware of the safe driving support information sign displayed by the display device.

As an optional aspect, the information presentation apparatus may further comprise an input switch device configured to accept an input executed by the driver when becoming aware of the safe driving support information sign displayed by the display device. Herein, the action determination section may be further configured to execute the driver awareness determination based on vehicle-inside information, which includes a signal indicating that the input switch device accepts the input.

Under such a configuration, the signal which indicates that the input was received is used as the vehicle-inside information; thus, the determination as to whether the driver is aware of the display of the safe driving support information is certainly made.

It is noted that the input device which receives the input from the driver is easily realized by using the existing operation switch device. In addition, also when a new input device is installed, it is easy to secure the installation space, not increasing the installation costs. Therefore, the configuration can be made easy; saving the useless costs can be possible.

As an optional aspect, the display control circuit may use, as the attenuation display mode in the display device, at least one of: a reduction in a size of the safe driving support information sign, a reduction in a brightness of the safe driving support information sign, a change in a color hue of the safe driving support information sign into a cold color hue, a reduction in a chroma saturation of the safe driving support information sign, a reduction in a lightness of the safe driving support information sign, and a simplification of the safe driving support information sign.

Any one of the above attenuation manners can provide an effect not to make the driver easily notice the displayed information; thus, the visual field of the driver can be made hard to be blocked.

As a further additional optional aspect, the display control circuit may use a simplification of the safe driving support information sign as the attenuation display mode in the display device; and the display control circuit may use an icon which responds to the driver when the action determination section obtains an affirmative result of the driver awareness determination, as the simplification of the safe driving support information sign.

Under such a configuration, when the driver executes the driving operation urged by the safe driving support information, a response is interactively made from the vehicle side according to the executed driving operation; thus, the driving pleasure of the driver is increased and the comfort in ride is improved.

As an optional aspect, the display device may include a plurality of display portions, which are arranged at positions ahead of a position in which the driver is seated.

As an optional aspect, the display control circuit may use, as the attenuation display mode in the display device, a display portion changeover to change into a display portion which is arranged at a position the driver not easily view.

The display portion or display position is moved so as not to make the driver easily notice the displayed information; thus, the visual field of the driver can be made hard to be blocked.

As an optional aspect, the information presentation apparatus may further comprise an infrastructure information acquisition device configured to acquire infrastructure information using at least one of vehicle-to-vehicle communications and road-to-vehicle communications. Herein, the safe driving support application detects a danger target having a danger of a collision of the vehicle based on the acquired infrastructure information; and the safe driving support information sign indicates the danger target. The display control circuit may be further configured to cause a target display portion of the display device to display a safe driving support information sign, the target display portion being one of the plurality display portions of the display device and being arranged at a position corresponding to a direction of the danger target. The display control circuit may be further configured to determine whether to cause the display device to execute the display erasure or the display attenuation of the safe driving support information sign based on not only a result of the driver awareness determination by the action determination section, but the acquired infrastructure information as well.

As a further optional aspect, the safe driving support application may detect a danger target posing a danger that the vehicle collides upon meeting at an intersection ahead of the vehicle based on the acquired infrastructure information; and the safe driving support information sign is an image symbolizing an appearance of the danger target. The action determination section may be further configured to obtain an affirmative result of the driver awareness determination when acquiring the vehicle-inside information which indicates that a brake of the vehicle is turned into an ON state. The display control circuit may be further configured to cause the target display portion of the display device to display the safe driving support information sign in a lighting-up state. The display control circuit may be further configured to execute a display portion changeover to change the target display portion that displays the safe driving support information sign between the plurality of display portions according to a movement direction of the danger target. The display control circuit may be further configured to cause the display device to execute the display erasure or the display attenuation of the safe driving support information sign in a case that not only an affirmative result of the driver awareness determination is obtained by the action determination section, but also a result of a determination that the danger target disappears is obtained based on the acquired infrastructure information. The display control circuit may be further configured to execute a display mode changeover to change a display mode of the safe driving support information sign into a highlight display mode to make the safe driving support information sign more conspicuous in a case that an affirmative result of the driver awareness determination is not obtained by the action determination section.

Under such a configuration, when a possibility that the vehicle collides upon meeting at the intersection is low, the display erasure or the display attenuation is made with respect to the safe driving support information. In contrast, when a possibility that the vehicle collides upon meeting at the intersection is high, the display highlight is made with respect to the safe driving support information. It becomes possible to prevent the accident upon meeting at the intersection more certainly.

As an optional aspect, the safe driving support application may detect a danger target posing a danger that the vehicle collides at starting off after waiting for a right turn at an intersection in a left-hand traffic, the danger target being a going-straight vehicle or a pedestrian, crossing a crosswalk; and the action determination section may obtain an affirmative result from the driver awareness determination when acquiring the vehicle-inside information which indicates that a brake of the vehicle is turned into an OFF state. The display control circuit may be further configured to cause a display portion of the display device to display the safe driving support information sign, the display portion being one of the plurality of display portions of the display device and being arranged at a position corresponding to a direction of the danger target. The display control circuit may be further configured to, when-both a going-straight vehicle and a pedestrian crossing a crosswalk are detected as danger targets, cause a display portion of the display device to display the safe driving support information sign in a lighting-up state, the display portion being arranged at a position corresponding to a direction of the going-straight vehicle. The display control circuit may be further configured to determine a presence or absence of the danger target based on the infrastructure information. The display control circuit may be further configured to, based on not only the affirmative result of the driving awareness determination obtained by the action determination section, but also a determination that no danger target exists, cause the display device to execute the display erasure or the display attenuation of the safe driving support information sign. The display control circuit may be further configured to, based on a determination that a danger target exists, executes a display mode changeover to change a display mode of the safe driving support information sign into a highlight display mode to make the safe driving support information sign more conspicuous.

When a possibility is low that after waiting for right-turn at an intersection in the left-hand traffic, the vehicle starts off and immediately collides, the display erasure or the display attenuation is made with respect to the safe driving support information. In contrast, when a possibility is high that after waiting for right-turn at an intersection in the left-hand traffic, the vehicle starts off and immediately collides, the display highlight is made with respect to the safe driving support information. Thus, it becomes possible to prevent more certainly the collision immediately after the starting-off of the vehicle having waited for right-turn in the left-hand traffic.

Further, both a going-straight vehicle and a pedestrian crossing a crosswalk may be detected as danger targets. In such a case, the going-straight vehicle and the pedestrian may be displayed in a lighting-up state in a specific display portion of the several display portions of the display device. This specific display portion is located at a position corresponding to a direction of the going-straight vehicle. Thus, even if there are existing several danger targets or obstacles, the driver only needs to see the safe driving support information in the single direction to check. This can allow the driver to perform a driving operation with a margin or mental allowance.

It is noted that the above configuration applies to the left-hand traffic like in Japan, UK. In this regard, however, the equivalent configuration can be naturally apply to the right-hand traffic in the US, Germany.

As an optional aspect, the information presentation apparatus may further comprise an infrastructure information acquisition device configured to acquire infrastructure information using at least one of vehicle-to-vehicle communications and road-to-vehicle communications. The safe driving support application may detect a danger target ahead of the vehicle, the danger target which needs to be gazed by the driver based on the acquired infrastructure information; and when the action determination section obtains an affirmative result of the driver awareness determination, the display control circuit may cause the display device to execute the display erasure or the display attenuation of the safe driving support information sign.

For instance, the safe driving support application may detect a danger target at which the driver of the vehicle needs to gaze based on the infrastructure information, the danger target being at least one of a temporary halt sign, a temporary halt marking, and a red traffic signal, the danger target being ahead of the vehicle; the action determination section may obtain an affirmative result of the driver awareness determination when as vehicle-inside information at least one of (i) information which indicates that a brake is turned into an ON state and (ii) information which indicates that an accelerator opening degree is turned into zero; and the display control circuit may cause the display device to display the safe driving support information sign in a lighting-up state. The display control circuit may be further configured to cause the display device to execute the display erasure or the display attenuation of the safe driving support information sign, when the action determination section obtains an affirmative result of the driver awareness determination, and cause the display device to execute a display mode changeover to change a display mode of the safe driving support information sign into a highlight display mode to make the safe driving support information sign more conspicuous, when the action determination section does not obtain an affirmative result of the driver awareness determination.

Under such a configuration, when a possibility that the vehicle stops is high, the display erasure or the display attenuation is made with respect to the safe driving support information. In contrast, when a possibility that the vehicle stops is low, the display highlight is made with respect to the safe driving support information. It thus becomes possible to help prevent an accident by the oversight of a temporary halt sign or red traffic signal more certainly.

When the driver does not perform a driving operation indicated by the safe driving support information, a possibility of a danger of an accident may increase.

To that end, as an optional aspect, in cases that an affirmative result of the driver awareness determination is not obtained by the action determination section, the display control circuit may execute a display mode changeover to change a display mode of the safe driving support information sign into a highlight display mode to make the safe driving support information sign more conspicuous.

It thus becomes possible to execute an accident prevention of a vehicle more certainly.

There is a case that the acquisition of the infrastructure information cannot be completed or the acquired infrastructure information has an error, not providing the vehicle with accurate infrastructure information.

To that end, as an optional aspect, when the infrastructure information acquisition device does not accurately acquire the infrastructure information, the display control circuit may cause the display device to display the safe driving support information sign for a predetermined time period; and after the predetermined time period elapses, the display control circuit may preferentially cause the display device to execute the display erasure or the display attenuation of the safe driving support information sign.

Such a configuration can prevent the driver from feeling botheration because of the display of the safe driving support information continued in the same mode as it is regardless of the driver having already recognized even if the accurate infrastructure information is not obtained.

As an optional aspect, when the action determination section does not accurately acquire the vehicle-inside information, the display control circuit may cause the display device to display the safe driving support information sign for a predetermined time period; and after the predetermined time period elapses, the display control circuit may preferentially cause the display device to execute the display erasure or the display attenuation of the safe driving support information sign.

Such a configuration can prevent the driver from feeling botheration because of the display of the safe driving support information continued in the same mode as it is regardless of the driver having already recognized even if the accurate vehicle-inside information is not obtained.

As an optional aspect, a plurality of different safe driving support information signs may be displayed over a plurality, of display portions of the display device; and in cases that, a plurality of determinations, which relate individually to the plurality of different safe driving support information signs, may be individually made in a time-based order during a time range, each of the plurality of determinations resulting in executing the display erasure or the display attenuation. Herein, the display control circuit may cause the display device to execute the display erasure or the display attenuation with respect to the plurality of different safe driving support signs, individually, in the time-based order of the relating determinations made in the time range.

Under such a configuration, the display erasure or display attenuation can be made in an order from the safe driving support information of which the necessity became low. Further, while only the save driving support information with high necessity of making the driver notice remains as needed according to the varying status. The driver can be appropriately made to recognize only the safe driving support information necessary in each status.

It will be obvious to those skilled in the art that various changes may be made in the above-described embodiments of the present invention. However, the scope of the present invention should be determined by the following claims.

What is claimed:

1. An information presentation apparatus in a vehicle, the apparatus comprising:
   a display control circuit configured to cause a display device to display a safe driving support information sign, which urges a driver of the vehicle to perform a driving operation responding to processing of a safe driving support application to support a safe driving of the vehicle; and
   an action determination section configured to execute a driver awareness determination as to whether the driver is aware of the safe driving support information sign,
   the display control circuit being further configured to,
   based on an affirmative result of the driver awareness determination obtained by the action determination section,
   cause the display device to execute a display erasure or a display attenuation of the driving support information sign, the display erasure stopping the displaying of the safe driving support information sign, the display attenuation executing a display mode changeover to change a display mode of the safe driving support information sign into an attenuation display mode, which helps prevent a blockage of a visual field of the driver,
   the action determination section being further configured to execute the driver awareness determination based on vehicle-inside information which includes a signal arising from an operation executed by the driver when the driver becomes aware of the safe driving support information sign displayed by the display device.

2. The information presentation apparatus according to claim 1,
   the action determination section being further configured to execute the driver awareness determination based on vehicle-inside information, which includes a sensor signal arising from a driving operation executed by the driver when the driver becomes aware of the safe driving support information sign displayed by the display device.

3. The information presentation apparatus according to claim 1, further comprising:
   an input switch device configured to accept an input executed by the driver when becoming aware of the safe driving support information sign displayed by the display device,
   the action determination section being further configured to execute the driver awareness determination based on vehicle-inside information, which includes a signal indicating that the input switch device accepts the input.

4. The information presentation apparatus according to claim 1, wherein
   the display control circuit uses, as the attenuation display mode in the display device, at least one of:
   a reduction in a size of the safe driving support information sign,
   a reduction in a brightness of the safe driving support information sign,
   a change in a color hue of the safe driving support information sign into a cold color hue,
   a reduction in a chroma saturation of the safe driving support information sign,
   a reduction in a lightness of the safe driving support information sign, and
   a simplification of the safe driving support information sign.

5. The information presentation apparatus according to claim 1, wherein:
   the display control circuit uses a simplification of the safe driving support information sign as the attenuation display mode in the display device; and
   the display control circuit uses an icon which responds to the driver when the action determination section obtains an affirmative result of the driver awareness determination, as the simplification of the safe driving support information sign.

6. The information presentation apparatus according to claim 1, wherein
   the display device includes a plurality of display portions, which are arranged at positions ahead of a position in which the driver is seated.

7. The information presentation apparatus according to claim 6, wherein
   the display control circuit uses, as the attenuation display mode in the display device, a display portion changeover to change into a display portion which is arranged at a position the driver not easily view.

8. The information presentation apparatus according to claim 6, further comprising:
   an infrastructure information acquisition device configured to acquire infrastructure information using at least one of vehicle-to-vehicle communications and road-to-vehicle communications, wherein:
the safe driving support application detects a danger target having a danger of a collision of the vehicle based on the acquired infrastructure information; and
the safe driving support information sign indicates the danger target,
the display control circuit being further configured to cause a target display portion of the display device to display a safe driving support information sign, the target display portion being one of the plurality display portions of the display device and being arranged at a position corresponding to a direction of the danger target,
the display control circuit being further configured to determine whether to cause the display device to execute the display erasure or the display attenuation of the safe driving support information sign based on not only a result of the driver awareness determination by the action determination section, but the acquired infrastructure information as well.

9. The information presentation apparatus according to claim 6, wherein;
a plurality of different safe driving support information signs are displayed over a plurality of display portions of the display device; and
in cases that, a plurality of determinations, which relate individually to the plurality of different safe driving support information signs, are individually made in a time-based order during a time range, each of the plurality of determinations resulting in executing the display erasure or the display attenuation,
the display control circuit causes the display device to execute the display erasure or the display attenuation with respect to the plurality of different safe driving support signs, individually, in the time-based order of the relating determinations made in the time range.

10. The information presentation apparatus according to claim 8, wherein:
the safe driving support application detects a danger target posing a danger that the vehicle collides upon meeting at an intersection ahead of the vehicle based on the acquired infrastructure information; and
the safe driving support information sign is an image symbolizing an appearance of the danger target,
the action determination section being further configured to obtain an affirmative result of the driver awareness determination when acquiring the vehicle-inside information which indicates that a brake of the vehicle is turned into an ON state,
the display control circuit being further configured to cause the target display portion of the display device to display the safe driving support information sign in a lighting-up state,
the display control circuit being further configured to execute a display portion changeover to change the target display portion that displays the safe driving support information sign between the plurality of display portions according to a movement direction of the danger target,
the display control circuit being further configured to cause the display device to execute the display erasure or the display attenuation of the safe driving support information sign in a case that not only an affirmative result of the driver awareness determination is obtained by the action determination section, but also a result of a determination that the danger target disappears is obtained based on the acquired infrastructure information, the display control circuit being further configured to execute a display mode changeover to change a display mode of the safe driving support information sign into a highlight display mode to make the safe driving support information sign more conspicuous in a case that an affirmative result of the driver awareness determination is not obtained by the action determination section.

11. The information presentation apparatus according to claim 8, wherein:
the safe driving support application detects a danger target posing a danger that the vehicle collides at starting off after waiting for a right turn at an intersection in a left-hand traffic, the danger target being a going-straight vehicle or a pedestrian crossing a crosswalk; and
the action determination section obtains an affirmative result from the driver awareness determination when acquiring the vehicle-inside information which indicates that a brake of the vehicle is turned into an OFF state,
the display control circuit being further configured to cause a display portion of the display device to display the safe driving support information sign, the display portion being one of the plurality of display portions of the display device and being arranged at a position corresponding to a direction of the danger target,
the display control circuit being further configured to, when both a going-straight vehicle and a pedestrian crossing a crosswalk are detected as danger targets, cause a display portion of the display device to display the safe driving support information sign in a lighting-up state, the display portion being arranged at a position corresponding to a direction of the going-straight vehicle,
the display control circuit being further configured to determine a presence or absence of the danger target based on the infrastructure information,
the display control circuit being further configured to, based on not only the affirmative result of the driving awareness determination obtained by the action determination section, but also a determination that no danger target exists, cause the display device to execute the display erasure or the display attenuation of the safe driving support information sign,
the display control circuit being further configured to, based on a determination that a danger target exists, executes a display mode changeover to change a display mode of the safe driving support information sign into a highlight display mode to make the safe driving support information sign more conspicuous.

12. The information presentation apparatus according to claim 8, wherein:
when the infrastructure information acquisition device does not accurately acquire the infrastructure information, the display control circuit causes the display device to display the safe driving support information sign for a predetermined time period; and
after the predetermined time period elapses, the display control circuit preferentially causes the display device to execute the display erasure or the display attenuation of the safe driving support information sign.

13. The information presentation apparatus according to claim 8, wherein:
the safe driving support application detects a danger target posing a danger that the vehicle collides at starting off after waiting for a left turn at an intersection in a right-hand traffic, the danger target being a going straight vehicle or a pedestrian crossing a crosswalk;

the action determination section obtains an affirmative result from the driver awareness determination when acquiring the vehicle-inside information which indicates that a brake of the vehicle is turned into an OFF state;

the display control circuit being further configured to cause a display portion of the display device to display the safe driving support information sign, the display portion being one of the plurality of display portions of the display device and being arranged at a position corresponding to a direction of the danger target, the display control circuit being further configured to, when both a going-straight vehicle and a pedestrian crossing a crosswalk are detected as danger targets, cause a display portion of the display device to display the safe driving support information sign in a lighting-up state, the display portion being arranged at a position corresponding to a direction of the going-straight vehicle, the display control circuit being further configured to determine a presence or absence of the danger target based on the infrastructure information, the display control, circuit being further configured to, based on not only the affirmative result of the driving awareness determination obtained by the action determination section, but also a determination that no danger target exists, cause the display device to execute the display erasure or the display attenuation of the safe driving support information sign, the display control circuit being further configured to, based on a determination that a danger target exists, executes a display mode changeover to change a display mode of the safe driving support information sign into a highlight display mode to make the safe driving support information sign more conspicuous.

14. The information presentation apparatus according to claim 1, further comprising:
an infrastructure information acquisition device configured to acquire infrastructure information using at least one of vehicle-to-vehicle communications and road-to-vehicle communications,
wherein:
the safe driving support application detects a danger target ahead of the vehicle, the danger target which needs to be gazed by the driver based on the acquired infrastructure information; and
when the action determination section obtains an affirmative result of the driver awareness determination,
the display control circuit causes the display device to execute the display erasure or the display attenuation of the safe driving support information sign.

15. The information presentation apparatus according to claim 14, wherein:
the safe driving support application detects a danger target at which the driver of the vehicle needs to gaze based on the infrastructure information, the danger target being at least one of a temporary halt sign, a temporary halt marking, and a red traffic signal, the danger target being ahead of the vehicle;
the action determination section obtains an affirmative result of the driver awareness determination when as vehicle-inside information at least one of (i) information which indicates that a brake is turned into an ON state and (ii) information which indicates that an accelerator opening degree is turned into zero; and the display control circuit causes the display device to display the safe driving support information sign in a lighting-up state,
the display control circuit being further configured to
cause the display device to execute the display erasure or the display attenuation of the safe driving support information sign, when the action determination section obtains an affirmative result of the driver awareness determination, and
cause the display device to execute a display mode changeover to change a display mode of the safe driving support information sign into a highlight display mode to make the safe driving support information sign more conspicuous, when the action determination section does not obtain an affirmative result of the driver awareness determination.

16. The information presentation apparatus according to claim 1, wherein
in cases that an affirmative result of the driver awareness determination is not obtained by the action determination section,
the display control circuit executes a display mode changeover to change a display mode of the safe driving support information sign into a highlight display mode to make the safe driving support information sign more conspicuous.

17. The information presentation apparatus according to claim 1, wherein:
when the action determination section does not accurately acquire the vehicle-inside information; the display control circuit causes the display device to display the safe driving support information sign for a predetermined time period; and
after the predetermined time period elapses, the display control circuit preferentially causes the display device to execute the display erasure or the display attenuation of the safe driving support information sign.

18. A method for presenting a driver in a vehicle with a driving support information notice,
the method comprising:
acquiring infrastructure information using at least one of vehicle-to-vehicle communications and road-to-vehicle communications;
detecting an attention target ahead of the vehicle, the attention target to which the driver needs to pay attention based on the acquired infrastructure information;
selecting a driving support application based on the detected attention target:
starting a notice presentation to present the driver with a driving support information notice associated with the selected driving support application in an initial presentation mode in a visible presentation manner or an audible presentation manner;
executing a driver awareness determination as to whether the driver is aware of the driving support information notice based on vehicle-inside information,
the vehicle-inside information being a signal arising from an operation executed by the driver when the driver becomes aware of the presented driving support information notice; and
executing, when an affirmative result is obtained from the executed driver awareness determination, one of (i) a presentation stoppage and (ii) a presentation attenuation of the driving support information notice, the presentation stoppage stopping the started notice presentation, the presentation attenuation executing a presentation mode changeover to change a presentation mode of the driving support information notice from the initial presentation mode into an attenuation presentation mode, the attenuation presentation mode reducing, compared with the initial presentation mode, a blockage against the driver during driving the vehicle towards the attention target.

\* \* \* \* \*